(12) United States Patent
Zhu et al.

(10) Patent No.: US 12,069,518 B2
(45) Date of Patent: Aug. 20, 2024

(54) SESSION HANDLING METHOD AND RELATED DEVICE

(71) Applicant: Huawei Technologies Co., Ltd., Shenzhen (CN)

(72) Inventors: Qianghua Zhu, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/576,210

(22) Filed: Jan. 14, 2022

(65) Prior Publication Data
US 2022/0217587 A1 Jul. 7, 2022

Related U.S. Application Data

(63) Continuation of application No. 16/791,784, filed on Feb. 14, 2020, now Pat. No. 11,228,951, which is a (Continued)

(30) Foreign Application Priority Data

Aug. 15, 2017 (CN) .......................... 201710698407.X

(51) Int. Cl.
*H04W 36/00* (2009.01)
*H04W 36/12* (2009.01)

(52) U.S. Cl.
CPC ....... *H04W 36/0033* (2013.01); *H04W 36/12* (2013.01)

(58) Field of Classification Search
CPC ....... H04W 48/18; H04W 60/00; H04W 8/08; H04W 76/11; H04W 8/12; H04W 36/06;
(Continued)

(56) References Cited

U.S. PATENT DOCUMENTS

2006/0123122 A1 6/2006 Jung et al.
2017/0142587 A1* 5/2017 Lee ........................ H04W 76/10
(Continued)

FOREIGN PATENT DOCUMENTS

CN 106937363 A 7/2017
CN 109429214 A 3/2019
(Continued)

OTHER PUBLICATIONS

SA WG2 Meeting #S2-120, S2-171708, TS 23.501: Handling of conflicting S-NSSAIs ,Qualcomm Incorporated, Mar. 27-31, 2017, Busan, South Korea, 5 pages.
(Continued)

*Primary Examiner* — Allahyar Kasraian
(74) *Attorney, Agent, or Firm* — Conley Rose, P.C.

(57) ABSTRACT

A session handling method and a related device, where the method includes: receiving, by a first access and mobility management function (AMF) network element, a first message from a second AMF network element, where the first message includes information about a network slice corresponding to current sessions of a terminal; when determining that the first AMF network element does not support a network slice corresponding to a first session, sending, by the first AMF network element, a first notification message to the second AMF network element, where the first notification message notifies that the first AMF network element does not support the network slice corresponding to the first session; and releasing, by the second AMF network element, a network resource corresponding to the first session. A waste of network resources can be reduced using this application.

29 Claims, 17 Drawing Sheets

Related U.S. Application Data continuation of application No. PCT/CN2018/085336, filed on May 2, 2018.

(58) Field of Classification Search
CPC ..... H04W 76/30; H04W 76/10; H04W 36/00; H04W 36/0033; H04W 36/24; H04W 8/06; H04W 36/12; H04W 36/0083; H04L 41/0893; H04L 29/08; H04L 67/16; H04L 65/1069

See application file for complete search history.

(56) References Cited

U.S. PATENT DOCUMENTS

| | | | |
|---|---|---|---|
| 2018/0227873 | A1 | 8/2018 | Vrzic et al. |
| 2018/0324577 | A1 | 11/2018 | Faccin et al. |
| 2018/0332523 | A1 | 11/2018 | Faccin et al. |
| 2018/0368042 | A1* | 12/2018 | Jin ............... H04W 36/18 |
| 2018/0368061 | A1 | 12/2018 | Fang et al. |
| 2019/0029065 | A1 | 1/2019 | Park et al. |
| 2019/0199802 | A1 | 6/2019 | Zhu et al. |
| 2020/0015311 | A1* | 1/2020 | Kim ............... H04W 68/005 |
| 2020/0037386 | A1 | 1/2020 | Park et al. |
| 2020/0059989 | A1* | 2/2020 | Velev ............... H04W 8/08 |
| 2020/0120570 | A1* | 4/2020 | Youn ............... H04W 76/11 |
| 2020/0120590 | A1 | 4/2020 | Trivisonno et al. |
| 2020/0137675 | A1 | 4/2020 | Park et al. |
| 2020/0145954 | A1 | 5/2020 | Wang et al. |
| 2020/0146077 | A1 | 5/2020 | Li et al. |
| 2020/0178112 | A1 | 6/2020 | Youn et al. |
| 2021/0153018 | A1* | 5/2021 | Fernandez Alonso ............... H04W 28/06 |

FOREIGN PATENT DOCUMENTS

| | | | |
|---|---|---|---|
| EP | 3499838 | A1 | 6/2019 |
| WO | 2018208371 | A1 | 11/2018 |
| WO | 2019098745 | A1 | 5/2019 |

OTHER PUBLICATIONS

SA WG2 Meeting #122, S2-174340, TS 23.501: Routing NSSAI to perform AMF selection by (R)AN, Huawei, HiSilicon, Jun. 26-30, 2017, San Jose Del Cabo, Mexico, 5 pages.

Ericsson, "TS 23.502: Correction of Registration procedures," SA WG2 Meeting #121, S2-174062, May 15-19, 2017 Hangzhou, P. R. China, 14 pages.

Huawei, et al., "TS 23.502 SMF information context synchronization between old AMF and new AMF," SA WG2 Meeting #122B, S2-175643, Aug. 21-25, 2017, Sophia Antipolis, France, 17 pages.

Qualcomm Incorporated, et al., "TS 23.501: PDU sessions handling for LADNs," SA WG2 Meeting #121 S2-173935, May 15-19, 2017, Hangzhou, P.R. China, 5 pages.

Huawei, "Xn based mobility for slicing," 3GPP TSG-RAN WG3 96, R3-171786, May 15-19, 2017, 3 pages.

Qualcomm Incorporated, 'TS 23.502: solution for non-3GPP (re)authentication at registration,' SA WG2 Meeting #S2-120, S2-171702, Mar. 27-31, 2017, Busan, South Korea, 14 pages.

3GPP TS 23.501 V1.2.0, "3rd Generation Partnership Project; Technical Specification Group Services and System Aspects; System Architecture for the 5G System; Stage 2 (Release 15)," Jul. 2017, 166 pages.

3GPP TS 23.502 V0.5.0, "3rd Generation Partnership Project; Technical Specification Group Services and System Aspects; Procedures for the 5G System; Stage 2 (Release 15)," Jul. 2017, 148 pages.

Qualcomm Incorporated "TS 23.501: Handling of PDU sessions at slice unavailability," 3GPP Draft; S2-174050, May 20, 2017, XP051289517, 10 pages.

Qualcomm Incorporated, et al., "TS 23. 502:PDU sessions handling for LADNs," 3GPP Draft; S2-174453, Jun. 20, 2017, XP051309510, 36 pages.

* cited by examiner

SESSION HANDLING METHOD AND RELATED DEVICE

CROSS-REFERENCE TO RELATED APPLICATIONS

This application is a continuation of U.S. patent application Ser. No. 16/791,784, filed on Feb. 14, 2020, which is a continuation of International Application No. PCT/CN2018/085336, filed on May 2, 2018. The International Application claims priority to Chinese Patent Application No. 201710698407.X, filed on Aug. 15, 2017. All of the aforementioned patent applications are hereby incorporated by reference in their entireties.

TECHNICAL FIELD

This application relates to the field of communications technologies, and in particular, to a session handling method and a related device.

BACKGROUND

A physical network can be divided into a plurality of virtual networks using a network slicing technology. One virtual network is used as one "network slice". All network slices are independent of each other. Network function customization and management are performed on each network slice depending on a requirement of a service scenario. A terminal may perform a plurality of types of sessions currently. For the different types of sessions, network slices supporting the corresponding types of sessions may be needed to provide services.

In an actual application, if a network slice corresponding to a session of a terminal is a network slice supported by an access and mobility management function (AMF) network element, the AMF network element may provide services for the session of the terminal. If a network slice corresponding to a session of a terminal is a network slice unsupported by the AMF network element, the AMF network element cannot provide services for the session of the terminal.

When a terminal needs to re-register with a network, an access network device may select a new AMF network element for the terminal due to a location change of the terminal or another reason, and an AMF network element that serves the terminal before is an old AMF network element. In other words, because the location of the terminal changes, the access network device needs to change an AMF network element for the terminal. To be more specific, an AMF network element that is to be changed to is named as a new AMF network element, and an AMF network element that is before the change is named as an old AMF network element. In an existing solution, the old AMF network element does not know which sessions can be served by the new AMF network element or which sessions cannot be served by the new AMF network element. Therefore, for the sessions that cannot be served by the new AMF network element, the old AMF network element still maintains information related to the sessions. If the old AMF network element does not receive signaling related to the sessions within a long time or receives a notification notifying that the sessions of the terminal is inactive, the old AMF network element releases network resources corresponding to the sessions. Consequently, a waste of network resources is caused.

SUMMARY

A technical problem to be resolved by embodiments of this application is to provide a session handling method and a related device, to reduce a waste of network resources.

According to a first aspect, an embodiment of this application provides a session handling method, where the method includes: sending, by a second AMF network element, a first message to a first AMF network element, where the first message includes information about a second network slice corresponding to a current session of a terminal, and the session includes one session or at least two sessions; when determining that the first AMF network element does not support a second network slice corresponding to the one session or a second network slice corresponding to all or some of the at least two sessions, sending, by the first AMF network element, a first notification message to the second AMF network element, where the first notification message is used to notify the second AMF network element that the first AMF network element does not support the second network slice corresponding to the one session or the second network slice corresponding to all or some of the at least two sessions; and releasing, by the second AMF network element, a network resource corresponding to the one session or network resources corresponding to all or some of the at least two sessions.

In the first aspect, the first AMF network element sends, to the second AMF network element, the first notification message notifying that the first AMF network element does not support the second network slice corresponding to the session of the terminal, such that after the second AMF network element receives the first notification message, the second AMF network element can release the network resource occupied by the session, thereby reducing a waste of network resources.

In a possible implementation, before the first AMF network element sends the first notification message to the second AMF network element, the method further includes: when determining that information about a first network slice supported by the first AMF network element does not include information about the second network slice corresponding to the one session or information about a first network slice supported by the first AMF network element does not include information about the second network slice corresponding to all or some of the at least two sessions, determining, by the first AMF network element, that the first AMF network element does not support the second network slice corresponding to the one session or the second network slice corresponding to all or some of the at least two sessions; or when determining that information about an allowed third network slice allocated to the terminal does not include information about the second network slice corresponding to the one session or information about a third network slice allocated to the terminal does not include information about the second network slice corresponding to all or some of the at least two sessions, determining, by the first AMF network element, that the first AMF network element does not support the second network slice corresponding to the one session or the second network slice corresponding to all or some of the at least two sessions, where optionally, the first AMF network element may obtain, from a network slice selection function (NSSF) network element, the information about allowed third network slice of the terminal.

In a possible implementation, the method further includes: sending, by the second AMF network element, a second notification message to a session management function (SMF) network element associated with a session identifier of the one session or SMF network elements associated with session identifiers of all or some of the at least two sessions, where the second notification message is used to notify the SMF network element that the terminal has moved out of a slice service area of the second AMF network element; and releasing, by the SMF network element, a network resource occupied by the session, associated with the SMF network element, of the terminal, thereby further reducing a waste of network resources.

In a possible implementation, the SMF network element sends a third notification message to a user-plane function (UPF) network element associated with the session identifier of the session, where the third notification message is used to notify the UPF network element that the terminal has moved out of the slice service area of the second AMF network element. The UPF network element releases a network resource occupied by the session, associated with the UPF network element, of the terminal, thereby further reducing a waste of network resources.

In a possible implementation, the first message is a context response message. In this case, before the second AMF network element sends the first message to the first AMF network element, the first AMF network element sends a terminal context obtaining request to the second AMF network element.

In a possible implementation, the first message further includes a mobility management context, a permanent identifier of the terminal, a session identifier, and a session management function SMF network element identifier associated with the session identifier. Additionally, the information about the second network slice corresponding to the session is information about a network slice supported by an SMF network element.

In a possible implementation, the first AMF network element sends a registration complete message to the terminal when determining that the first AMF network element supports the second network slice corresponding to the one session or the second network slice corresponding to all or some of the at least two sessions.

In a possible implementation, the first message further includes a session identifier and an SMF network element identifier associated with the session identifier. Additionally, the information about the second network slice corresponding to the session is information about a network slice supported by an SMF network element.

In a possible implementation, when determining that the first AMF network element supports the second network slice corresponding to the one session or the second network slice corresponding to all or some of the at least two sessions, the first AMF network element prepares a network resource for the one session or network resources for all or some of the at least two sessions.

In a possible implementation, the first message further includes a data network name (DNN) of each current session of the terminal, such that the first AMF network element selects an SMF network element based on the DNN and the information about the supported second network slice corresponding to the session.

In a possible implementation, the second AMF network element releases a network resource corresponding to the one session or network resources corresponding to all or some of the at least two sessions, where a possible execution manner is as follows: when receiving the first notification message, immediately releasing, by the second AMF network element, the network resource corresponding to the one session or the network resources corresponding to all or some of the at least two sessions. Alternatively, a possible execution manner is as follows: when receiving the first notification message, releasing, by the second AMF network element after a preset time period elapses, the network resource corresponding to the one session or the network resources corresponding to all or some of the at least two sessions.

According to a second aspect, an embodiment of this application provides another session handling method, where the method includes: obtaining, by a second AMF network element, information about a second network slice corresponding to a current session of a terminal, where the session includes one session or at least two sessions; receiving, by the second AMF network element, a first message from a network device, where the first message includes an identifier of a first AMF network element that a session is to be changed to; and when determining that the first AMF network element does not support a second network slice corresponding to the one session or a second network slice corresponding to all or some of the at least two sessions, releasing, by the second AMF network element, a network resource corresponding to the one session or network resources corresponding to all or some of the at least two sessions.

In the second aspect, the second AMF determines that the first AMF network element does not support the second network slice corresponding to all or some of the sessions of the terminal, such that the second AMF network element can release the network resource occupied by the unsupported session, thereby reducing a waste of network resources.

In a possible implementation, the network device may be the first AMF network element, or the network device may be an NRF network element. This is not limited in this embodiment of the present disclosure.

In a possible implementation, before releasing the network resource corresponding to the one session or the network resources corresponding to all or some of the at least two sessions, the second AMF network element further performs a step of: when determining that information about a first network slice supported by the first AMF network element does not include information about the second network slice corresponding to the one session or information about a first network slice supported by the first AMF network element does not include information about the second network slice corresponding to all or some of the at least two sessions, determining, by the second AMF network element, that the first AMF network element does not support the second network slice corresponding to the one session or the second network slice corresponding to all or some of the at least two sessions; or when determining that information about an allowed third network slice allocated to the terminal does not include information about the second network slice corresponding to the one session or information about an allowed third network slice allocated to the terminal does not include information about the second network slice corresponding to all or some of the at least two sessions, determining, by the second AMF network element, that the first AMF network element does not support the second network slice corresponding to the one session or the second network slice corresponding to all or some of the at least two sessions. Optionally, the second AMF network element may obtain, from an NSSF network element, the information about allowed third network slice of the terminal. In this way, the second AMF network element can determine a session that can be served by the first AMF network element and a session that cannot be served by the first AMF network element.

In a possible implementation, the first message further includes the information about the first network slice supported by the first AMF network element, such that the second AMF network element determines, based on the information about the first network slice, whether the information about the first network slice includes information about a second network slice corresponding to any current session of the terminal, and further determines whether the first AMF network element can serve the session.

In a possible implementation, when releasing the network resource corresponding to the one session or the network resources corresponding to all or some of the at least two sessions, the method further includes sending, by the second AMF network element, a second notification message to a session management function SMF network element associated with a session identifier of the one session or SMF network elements associated with session identifiers of all or some of the at least two sessions, where the second notification message is used to notify the SMF network element that the terminal has moved out of a slice service area of the second AMF network element. The SMF network element releases a network resource occupied by the session, associated with the SMF network element, of the terminal, thereby further reducing a waste of network resources.

In a possible implementation, the SMF network element sends a third notification message to a UPF network element associated with the session identifier of the session, where the third notification message is used to notify the UPF network element that the terminal has moved out of the slice service area of the second AMF network element. The UPF network element releases a network resource occupied by the session, associated with the UPF network element, of the terminal, thereby further reducing a waste of network resources.

In a possible implementation, the method further includes: when determining that the first AMF network element supports the second network slice corresponding to the one session or the second network slice corresponding to all or some of the at least two sessions, sending, by the second AMF network element, a first notification message to the first AMF network element, where the first notification message is used to notify the first AMF network element that the first AMF network element supports the second network slice corresponding to the one session or the second network slice corresponding to all or some of the at least two sessions; and preparing, by the first AMF network element, a network resource for the one session or network resources for all or some of the at least two sessions.

In a possible implementation, the first notification message further includes a DNN of the session corresponding to the second network slice supported by the first AMF network element, such that the first AMF network element selects an SMF network element based on the DNN and the information about the supported second network slice corresponding to the session.

According to a third aspect, an embodiment of this application provides another session handling method, where the method includes: obtaining, by a second AMF, information about a second network slice corresponding to a current session of a terminal, where the session includes one session or at least two sessions; receiving, by the second AMF network element, a first message from a network device, where the first message includes information about a first network slice supported by a first AMF network element; and when determining that the information about the first network slice does not include information about a second network slice corresponding to a second session, releasing, by the second AMF network element, a network resource corresponding to the second session, where the second session is included in the session, and a session in the session exclusive of the second session is the first session.

In the third aspect, it is determined that the first AMF network element does not support a second network slice corresponding to all or some of the session of the terminal, such that the second AMF network element can release network resources occupied by the unsupported session, thereby reducing a waste of network resources.

In a possible implementation, the method further includes: when releasing a network resource corresponding to the second session, sending, by the second AMF network element, a second notification message to a session management function SMF network element associated with the second session, where the second notification message is used to notify the SMF network element that the terminal has moved out of a slice service area of the second AMF network element; and releasing, by the SMF network element, a network resource occupied by the session, associated with the SMF network element, of the terminal, thereby further reducing a waste of network resources.

In a possible implementation, the SMF network element sends a third notification message to a UPF network element associated with the session identifier of the session, where the third notification message is used to notify the UPF network element that the terminal has moved out of the slice service area of the second AMF network element. The UPF network element releases a network resource occupied by the session, associated with the UPF network element of the terminal, thereby further reducing a waste of network resources.

In a possible implementation, the method further includes: when determining that the information about the first network slice includes information about a second network slice corresponding to a first session, sending, by the second AMF network element, a first notification message to the first AMF network element, where the first notification message is used to notify the first AMF network element that the information about the first network slice includes the information about the second network slice corresponding to the first session; or when determining that the first AMF network element does not support a second network slice corresponding to a third session, sending, by the first AMF network element, a fourth notification message to the second AMF network element, where the fourth notification message is used to notify that the first AMF network element does not support the second network slice corresponding to the third session, and the third session is all or some sessions of the first session.

In a possible implementation, the method further includes: when determining that the first AMF network element does not support a second network slice corresponding to a third session, sending, by the first AMF network element, a fourth notification message to the second AMF network element, where the fourth notification message is used to notify that the first AMF network element does not support the second network slice corresponding to the third session, and the third session is all or some sessions of the first session; and releasing, by the second AMF network element, a network resource corresponding to the third session.

In a possible implementation, before the first AMF network element sends the fourth notification message to the second AMF network element, the method further includes: obtaining, by the first AMF network element, information about an allowed third network slice allocated to the terminal; and when determining that the information about the third network slice does not include information about a second network slice corresponding to the third session, determining, by the first AMF network element, that the first AMF network element does not support the second network slice corresponding to the third session. Optionally, the first AMF network element may obtain, from an NSSF network element, the information about the allowed third network slice of the terminal.

In a possible implementation, the first notification message further includes a DNN of the first session, such that the first AMF network element selects an SMF network element based on the DNN and the information about the supported second network slice corresponding to the session.

According to a fourth aspect, an embodiment of this application provides a first AMF network element, where the first AMF network element has functions of implementing actions of the first AMF network element in the foregoing method design. The functions may be implemented by hardware, or may be implemented by hardware by executing corresponding software, and the hardware or software includes one or more modules corresponding to the functions.

In a possible implementation, the first AMF network element includes a processor, and the processor is configured to support the first AMF network element in performing corresponding functions in the foregoing method. Further, the first AMF network element may further include a communications interface, where the communications interface is configured to support communication between the first AMF network element and a second AMF network element or another network element. Further, the first AMF network element may further include a memory, where the memory is configured to be coupled to the processor and stores a program instruction and data that are necessary for the first AMF network element.

According to a fifth aspect, an embodiment of this application provides a second AMF network element, where the second AMF network element has functions of implementing actions of the second AMF network element in the foregoing method design. The functions may be implemented by hardware, or may be implemented by hardware by executing corresponding software, and the hardware or software includes one or more modules corresponding to the functions.

In a possible implementation, the second AMF network element includes a processor, and the processor is configured to support the second AMF network element in performing corresponding functions in the foregoing method. Further, the second AMF network element may further include a communications interface, where the communications interface is configured to support communication between the second AMF network element and a first AMF network element, an SMF network element, or another network element. Further, the second AMF network element may further include a memory, where the memory is configured to be coupled to the processor and stores a program instruction and data that are necessary for the second AMF network element.

According to a sixth aspect, an embodiment of this application provides an SMF network element, where the SMF network element has functions of implementing actions of the SMF network element in the foregoing method design. The functions may be implemented by hardware, or may be implemented by hardware by executing corresponding software, and the hardware or software includes one or more modules corresponding to the functions.

In a possible implementation, the SMF network element includes a processor, and the processor is configured to support the SMF network element in performing corresponding functions in the foregoing method. Further, the SMF network element may further include a communications interface, where the communications interface is configured to support communication between the SMF network element and a second AMF network element, a UPF network element, or another network element. Further, the SMF network element may further include a memory, where the memory is configured to be coupled to the processor and stores a program instruction and data that are necessary for the SMF network element.

According to a seventh aspect, an embodiment of this application provides a UPF network element, where the UPF network element has functions of implementing actions of the UPF network element in the foregoing method design. The functions may be implemented by hardware, or may be implemented by hardware by executing corresponding software, and the hardware or software includes one or more modules corresponding to the functions.

In a possible implementation, the UPF network element includes a processor, and the processor is configured to support the UPF network element in performing corresponding functions in the foregoing method. Further, the UPF network element may further include a communications interface, where the communications interface is configured to support communication between the UPF network element and an SMF network element or another network element. Further, the UPF network element may further include a memory, where the memory is configured to be coupled to the processor and stores a program instruction and data that are necessary for the UPF network element.

According to an eighth aspect, a communications system is provided, where the communications system includes the first AMF network element according to the fourth aspect and the second AMF network element according to the fifth aspect; or includes the first AMF network element according to the fourth aspect, the second AMF network element according to the fifth aspect, and the SMF network element according to the sixth aspect; or includes the first AMF network element according to the fourth aspect, the second AMF network element according to the fifth aspect, the SMF network element according to the sixth aspect, and the UPF network element according to the seventh aspect.

According to a ninth aspect, a computer readable medium is provided, and is configured to store a computer program, where the computer program includes an instruction used to perform the method in any one of the first aspect or the possible implementations of the first aspect.

According to a tenth aspect, a computer readable medium is provided, and is configured to store a computer program, where the computer program includes an instruction used to perform the method in any one of the second aspect or the possible implementations of the second aspect.

According to an eleventh aspect, a computer readable medium is provided, and is configured to store a computer program, where the computer program includes an instruction used to perform the method in any one of the third aspect or the possible implementations of the third aspect.

According to a twelfth aspect, a computer program product including an instruction is provided, where when the computer program product runs on a computer, the computer performs the method in any one of the first aspect or the possible implementations of the first aspect.

According to a thirteenth aspect, a computer program product including an instruction is provided, where when the computer program product runs on a computer, the computer performs the method in any one of the second aspect or the possible implementations of the second aspect.

According to a fourteenth aspect, a computer program product including an instruction is provided, where when the computer program product runs on a computer, the computer performs the method in any one of the third aspect or the possible implementations of the third aspect.

Compared with other approaches, in the embodiments of this application, when determining that the first AMF network element supports the network slice corresponding to the current session of the terminal, the first AMF network element can send the first notification message to the second AMF network element, such that the second AMF network element can release the first network resource in a timely manner, thereby reducing a waste of network resources.

DESCRIPTION OF EMBODIMENTS

The following describes the embodiments of this application with reference to the accompanying drawings in the embodiments of this application.

Figure 1:
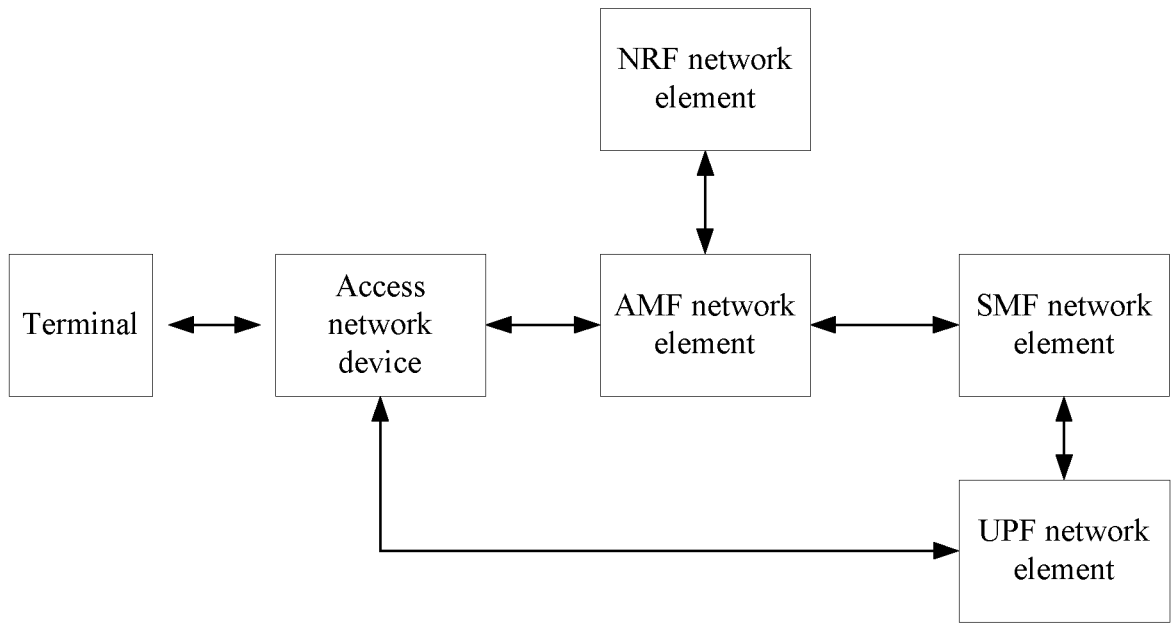
FIG. 1 is a schematic architectural diagram of a communications system according to an embodiment of this application.

Referring to FIG. 1, FIG. 1 is a schematic architectural diagram of a communications system according to an embodiment of this application. The following describes various network elements in FIG. 1.

Terminal: may be a user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network. An air interface technology is used for mutual communication between a terminal and an access network device.

Radio access network (RAN) device: is mainly responsible for implementing functions on an air interface side such as radio-resource management, quality of service (QoS) management, and data compression and encryption. The access network device may include stations in various forms, for example, a macro base station, a micro base station (also referred to as a small cell), a relay station, and an access point. A name of a device having a function of a base station may differ in systems using different radio access technologies. For example, in a $5^{th}$ generation (5G) system, the device is referred to as a gNB; in a Long Term Evolution (LTE) system, the device is referred to as an evolved NodeB (eNB or eNodeB); in a $3^{rd}$ generation (3G) system, the device is referred to as a NodeB.

Access and mobility management function (AMF) network element: is a core-network network element and is mainly responsible for a signaling processing part, to be more specific, control-plane functions including functions such as access control, mobility management, attachment, detachment, and gateway selection. When serving a session of a terminal, the AMF network element provides a control-plane storage resource for the session, to store a session identifier, an SMF network element identifier associated with the session identifier, and the like.

Session management function (SMF) network element: is responsible for user-plane network element selection, user-plane network element redirection, Internet Protocol (IP) address allocation, bearer setup, change, and release, and QoS control.

Network function repository function (NRF) network element: stores information about another network element, for example, information about an AMF network element and information about an SMF network element.

User-plane function (UPF) network element: is responsible for forwarding and receiving user data on a terminal. The UPF network element may receive user data from a data network, and transmit the user data to a terminal using an access network device; or may receive user data from a terminal using an access network device, and forward the user data to a data network. A transmission resource and a scheduling function that serve a terminal in a UPF network element are managed and controlled by the SMF network element.

In an architecture shown in FIG. 1, an access network device may communicate with at least one terminal, and may be connected to at least one or more AMF network elements. One AMF network element may support one or more different types of network slices. Different AMF network elements may support different types of network slices. One AMF network element may establish a communication connection to a plurality of SMF network elements. Each SMF network element is located in one network slice instance, and one SMF network element corresponds to a network slice supported by one AMF network element. Optionally, one SMF network element may be connected to a plurality of AMF network elements. In addition, one SMF network element may be connected to a plurality of UPF network elements, and one UPF network element may be connected to one SMF network element. In this case, one SMF network element can manage and control a plurality of UPF network elements, and one UPF network element is managed and controlled by one SMF network element. A UPF network element may establish a connection to an access network device, to implement data transmission related to a terminal.

For example, one AMF network element establishes a connection to two SMF network elements, where the two SMF network elements are a first SMF network element and a second SMF network element. A network slice type supported by the AMF network element includes a network slice type 1 and a network slice type 2, where the network slice type 1 corresponds to a network slice 1, and the network slice type 2 corresponds to a network slice 2. In this case, the first SMF network element is an SMF network element corresponding to the network slice 1, and the second SMF network element is an SMF network element corresponding to the network slice 2.

It should be noted that, in this embodiment of this application, information about a network slice corresponding to a session is used to indicate information about a network slice that can support a service type of the session. Additionally, an SMF network element associated with a session identifier is an SMF network element that serves the session.

Optionally, in this embodiment of this application, a network slice corresponding to the SMF network element may also be described as a network slice in which the SMF network element is located. Further, one type of network slice may correspond to a plurality of network slice instances. Therefore, a network slice corresponding to an SMF network element may also be described as a network slice instance corresponding to the SMF network element, and a network slice in which the SMF network element is located may also be described as a network slice instance in which the SMF network element is located. This is not limited in this embodiment of this application.

In a process in which a terminal registers with a network, the terminal sends configured network slice information to an AMF network element using an access network device, for example, the network slice information may be network slice selection assistance information (NSSAI). The AMF network element determines, based on terminal subscription and an operator policy, which slice information can be used by the terminal, and return, to the terminal, NSSAI information accepted by the network. Next, in a process in which the terminal establishes a session, the terminal sends the accepted NSSAI information to the access network device, such that the access network device selects, for the terminal, an AMF network element that supports the accepted NSSAI information. Finally, the AMF network element selects an SMF network element for the terminal, and the SMF network element selects a UPF network element to provide a session service for the terminal.

In an application, if a network slice corresponding to a session of a terminal is a network slice supported by an AMF network element, the AMF network element may serve the session of the terminal. Alternatively, if a network slice corresponding to a session of a terminal is a network slice unsupported by an AMF network element, the AMF network element cannot serve the session of the terminal.

Figure 2A:
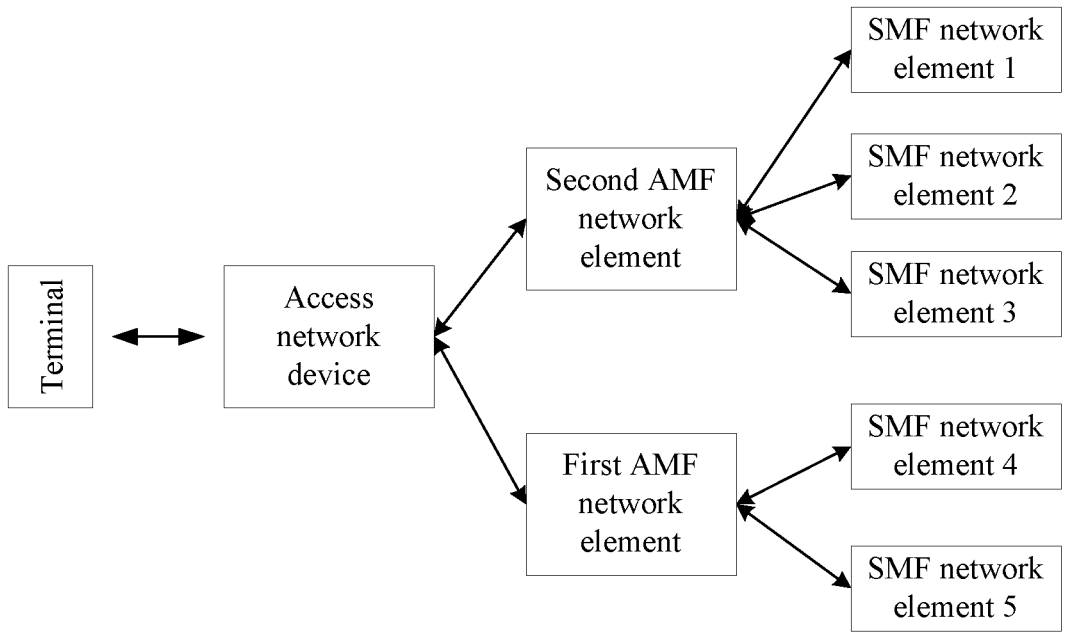
FIG. 2A is a possible scenario diagram according to an embodiment of this application.

Referring to FIG. 2A, FIG. 2A is a schematic diagram of a possible scenario according to an embodiment of this application. As shown in FIG. 2A, a terminal communicates with an access network device. The access network device is connected to both a first AMF network element and a second AMF network element, the second AMF network element establishes a connection to all of an SMF network element 1, an SMF 2, and an SMF network element 3, and the first AMF network element establishes a connection to both an SMF network element 4 and an SMF 5. The second AMF network element supports a network slice 1, a network slice 2, and a network slice 3, a network slice in which the SMF network element 1 is located is the network slice 1, a network slice in which the SMF network element 2 is located is the network slice 2, and a network slice in which the SMF network element 3 is located is the network slice 3. The first AMF network element supports the network slice 1 and a network slice 4, a network slice in which the SMF network element 4 is located is the network slice 1, and a network slice in which the SMF network element 5 is located is the network slice 4.

Based on a scenario diagram in FIG. 2A, for example, after the terminal registers with a network using the access network device, an AMF network element that serves sessions of the terminal is the second AMF network element. Network slices corresponding to the sessions established by the terminal are the network slice 1 and the network slice 2. When the connection to the terminal is interrupted and the terminal is in an idle state, if the terminal needs to re-register with the network, the access network device may select a first AMF network element for the terminal due to a location change of the terminal or another reason. Because the network slices corresponding to the sessions of the terminal that need to be restored are the network slice 1 and the network slice 2, and the first AMF network element supports the network slice 1, but does not support the network slice 2, the first AMF network element can restore only a session of the terminal corresponding to the network slice 1. In an existing solution, because the second AMF network element is unaware of a session that can be served by the first AMF network element and a session that cannot be served by the first AMF network element, the second AMF network element still maintains information about a session corresponding to the network slice 1, and an SMF network element 2 associated with the session corresponding to the network slice 1 continues to wait for signaling about the session. If no signaling about the session is received within a long time or the second AMF network element receives a notification notifying that a session in UE is inactive, a network resource corresponding to the session is released, for example, a control-plane resource occupied by information related to a session in the second AMF network element or a control-plane resource occupied by signaling in the SMF network element 2. Consequently, a waste of network resources is caused within a time in which release is not performed.

Figure 2B:
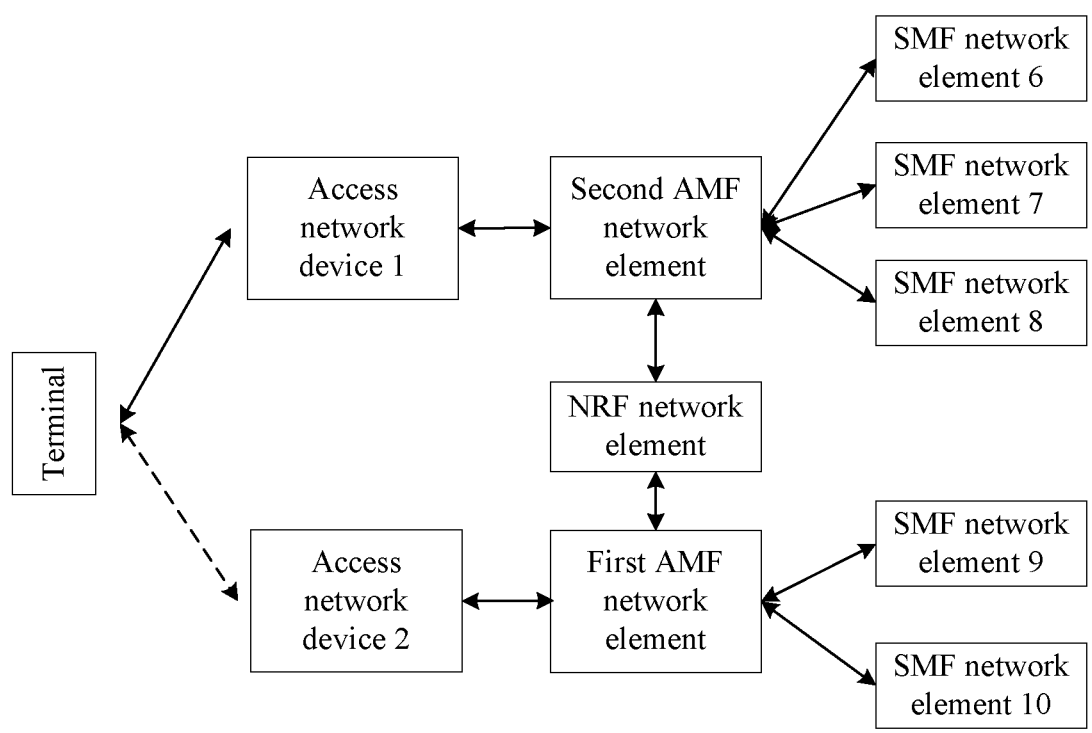
FIG. 2B is another possible scenario diagram according to an embodiment of this application.

Further, referring to FIG. 2B, FIG. 2B is a schematic diagram of another possible scenario according to an embodiment of this application. As shown in FIG. 2B, a terminal establishes a connection to an access network device 1. The access network device 1 is connected to a second AMF network element. The second AMF network element establishes a connection to all of an SMF network element 6, an SMF 7, and an SMF network element 8. A first AMF network element establishes a connection to both an SMF network element 9 and an SMF 10, and the first AMF network element establishes a connection to an access network device 2. The second AMF network element supports a network slice 1, a network slice 2, and a network slice 3, a network slice in which the SMF network element 6 is located is the network slice 1, a network slice in which the SMF network element 7 is located is the network slice 2, a network slice in which the SMF network element 8 is located is the network slice 3, a network slice in which the SMF network element 9 is located is the network slice 1, and a network slice in which the SMF network element 10 is located is a network slice 4.

Based on a scenario diagram in FIG. 2B, for example, after the terminal registers with a network using the access network device 1, an AMF network element that serves sessions of the terminal is the second AMF network element. Network slices corresponding to the sessions established by the terminal are the network slice 1 and the network slice 2. However, the access network device 1 needs to change an AMF network element for the terminal due to a location change of the terminal. The second AMF network element sends a network element discovery request to the NRF, and the NRF selects the first AMF network element for the terminal. The network slices corresponding to the sessions of the terminal that need to be restored are the network slice 1 and the network slice 2, but the first AMF network element does not support the network slice 2. Therefore, the first AMF network element can restore only a session of the terminal corresponding to the network slice 1. In an existing solution, because the second AMF network element is unaware of a session that can be served by the first AMF network element and a session that cannot be served by the first AMF network element, the second AMF network element still maintains information about a session corresponding to the network slice 1, and an SMF network element 7 associated with the session corresponding to the network slice 1 continues to wait for signaling about the session. Further, optionally, a UPF network element associated with the session corresponding to the network slice 1 continues to wait for receiving a data packet of the session. If no signaling about the session is received within a long time or the second AMF network element receives a notification notifying that a session in UE is inactive, a network resource corresponding to the session is released, for example, a control-plane resource occupied by information related to a session in the second AMF network element, a control-plane resource occupied by signaling in the SMF network element 7, or a user-plane transmission resource occupied by a session of the UPF network element. Consequently, a waste of network resources is caused.

It should be noted that information about each network slice in any embodiment of this application may include one or all of a network slice identifier and single network slice selection assistance information (S-NSSAI).

The network slice identifier may be represented using at least one of (1) to (7).

(1) Network slice type information: for example, the network slice type information may indicate a network slice type such as enhanced mobile broadband (eMBB), ultra-reliable low latency communications (URLLC), massive machine type communication (mMTC), or optionally, the network slice type information may indicate an end-to-end network slice type including a RAN-to-core-network (CN) network slice type, a RAN-side network slice type, or a CN-side network slice type.

(2) Service type information: is related to a specific service, for example, the service type information may indicate information about a service feature or a specific service such as a video service, an Internet of Vehicles service, or a voice service.

(3) Tenant information: is used to indicate information about a client creating or renting the network slice, for example, Tencent or the State Grid.

(4) User group information: is grouping information used to instruct to group users based on a feature, for example, a user level.

(5) Slice group information: is used to instruct to group network slices based on a feature, for example, all network slices accessible by the terminal may be classified as one slice group, or to group network slices according to another standard.

(6) Network slice instance information: is used to indicate an identifier and feature information of an instance created for the network slice, for example, an identifier may be allocated to a network slice instance to indicate the network slice instance, or a new identifier may be mapped to based on a network slice instance identifier, to associate the network slice instance, and a receiving party can identify, based on the identifier, a specific network slice instance indicated by the identifier.

(7) Dedicated core network (DCN) identifier: is used to uniquely indicate a dedicated core network in a Long Term Evolution (LTE) system or an enhanced LTE (eLTE) system, for example, a core network specific to the Internet of Things, and optionally, mapping between the DCN identifier and the network slice identifier may be performed, a network slice identifier can be obtained based on a mapping to a DCN identifier, and a DCN identifier can be obtained based on a mapping to a network slice identifier.

The S-NSSAI includes at least information about a slice/service type (SST), and optionally, may further include slice differentiation information (SD). The SST information is used to indicate an action of a network slice, for example, a feature or service type of the network slice, the SD information is complementary information of the SST, and if the SST points to a plurality of network slice instances, SD may correspond to a unique network slice instance.

It should be understood that, in this embodiment of this application, each network slice can use at least one type of information in parameters that represents the network slice, for example, the information about the network slice may be represented by the network slice type, may be represented by the network slice type and the service type, may be represented by the service type and the tenant information, or the like. This is not limited in this embodiment of this application. Details about how information about a network slice is represented are not repeated in the following. Optionally, no limitation is imposed on a specific coding scheme for the information about the network slice. Different fields that can be carried in an interface message between different devices may represent information about different network slices, or information about different network slices may be represented by abstracted index values, and different index values may correspond to different network slices. Certainly, in addition to the foregoing identifier, another identifier may be further used. This is not limited herein. It should be understood that if the terminal, the access network device, or the core network device supports a plurality of network slices, information about the network slices supported by the terminal, the access network device, or the core network device may be represented in a form of listing the foregoing at least one identifier.

This embodiment of this application may be further applied to another communications system that supports a network slice. The terms "system" and "network" can be interchanged with each other. System architectures described in the embodiments of this application are intended to describe the technical solutions in the embodiments of this application, but are not intended to limit the technical solutions provided in the embodiments of this application. A person of ordinary skill in the art may know that, as network architectures evolve, the technical solutions provided in the embodiments of this application are further applicable to a similar technical problem.

The following further describes the embodiments of this application based on common aspects included in this application.

In an existing solution, for example, in the foregoing two scenarios, for a session that cannot be served by the new AMF network element, the old AMF network element cannot release information about the session in a timely manner, causing a waste of network resources.

In view of this, the embodiments of this application provide a session handling method and a first AMF network element, a second AMF network element, an SMF network element, a UPF network element, and a system that are based on the method. The method includes: receiving, by a first AMF network element, a first message from a second AMF network element, where the first message includes information about a second network slice corresponding to a current session of a terminal, and the session includes one session or at least two sessions; when determining that the first AMF network element does not support a second network slice corresponding to the one session or a second network slice corresponding to all or some of the at least two sessions, sending, by the first AMF network element, a first notification message to the second AMF network element, where the first notification message is used to notify the second AMF network element that the first AMF network element does not support the second network slice corresponding to the one session or the second network slice corresponding to all or some of the at least two sessions; and releasing, by the second AMF network element, a network resource corresponding to the one session or network resources corresponding to all or some of the at least two sessions. The network resource corresponding to the one session or the network resources corresponding to all or some of the at least two sessions may be referred to as a first network resource. For example, the method may be shown in FIG. 3.

In an example, before the first AMF network element sends the first notification message to the second AMF network element, when determining that information about a first network slice supported by the first AMF network element does not include information about the second network slice corresponding to the one session or information about a first network slice does not include information about the second network slice corresponding to all or some of the at least two sessions, the first AMF network element may further determine that the first AMF network element does not support the second network slice corresponding to the one session or the second network slice corresponding to all or some of the at least two sessions; or when determining that information about an allowed third network slice allocated to the terminal does not include information about the second network slice corresponding to the one session or information about a third network slice allocated to the terminal does not include information about the second network slice corresponding to all or some of the at least two sessions, the first AMF network element may further determine that the first AMF network element does not support the second network slice corresponding to the one session or the second network slice corresponding to all or some of the at least two sessions.

In a possible implementation, the first message may be a context response message. Before receiving the first message from the second AMF network element, the first AMF network element may further send a context obtaining request of the terminal to the second AMF network element.

In this implementation, the first message may further include a mobility management context, a permanent identifier of the terminal, a session identifier, and an SMF network element identifier associated with the session identifier. In this case, the information about the second network slice corresponding to the session is information about a network slice supported by the SMF network element.

In this implementation, the first AMF network element may further send a registration complete message to the terminal when determining that the first AMF network element supports the second network slice corresponding to the one session or the second network slice corresponding to all or some of the at least two sessions.

In another possible implementation, the first message may further include a session identifier and an SMF network element identifier associated with the session identifier. In this case, the information about the second network slice corresponding to the session is information about a network slice supported by the SMF network element.

In this implementation, when determining that the first AMF network element supports the second network slice corresponding to the one session or the second network slice corresponding to all or some of the at least two sessions, the first AMF network element may further prepare a network resource for the one session or network resources for all or some of the at least two sessions. The network resource herein may be referred to as a second network resource.

In an example, the first message may further include a data network name (DNN) of each current session of the terminal.

In an example, when receiving the first notification message, the second AMF network element may immediately release the first network resource, or the second AMF network element may release the first network resource after a preset time period elapses.

Further, the second AMF network element may further send a second notification message to an SMF network element associated with a session identifier of the one session or SMF network elements associated with session identifiers of all or some of the at least two sessions. The second notification message is used to notify the SMF network element that the terminal has moved out of a slice service area of the second AMF network element. Additionally, the SMF network element releases a network resource occupied by a session, associated with the SMF network element, of the terminal. The network resource occupied by the session, associated with the SMF network element, of the terminal may be referred to as a third network resource.

Further, the SMF network element may further send a third notification message to a UPF network element associated with the session identifier, where the third notification message is used to notify the UPF network element that the terminal has moved out of the slice service area of the second AMF network element. Additionally, the UPF network element releases a network resource occupied by a session, associated with the UPF network element of the terminal. The network resource occupied by the session, associated with the UPF network element of the terminal may be referred to as a fourth network resource.

In this embodiment of this application, when determining that the first AMF network element supports a network slice corresponding to a current session of the terminal, the first AMF network element can send the first notification message to the second AMF network element. This way, the second AMF network element can release the first network resource in a timely manner, thereby reducing a waste of network resources.

Figure 3:
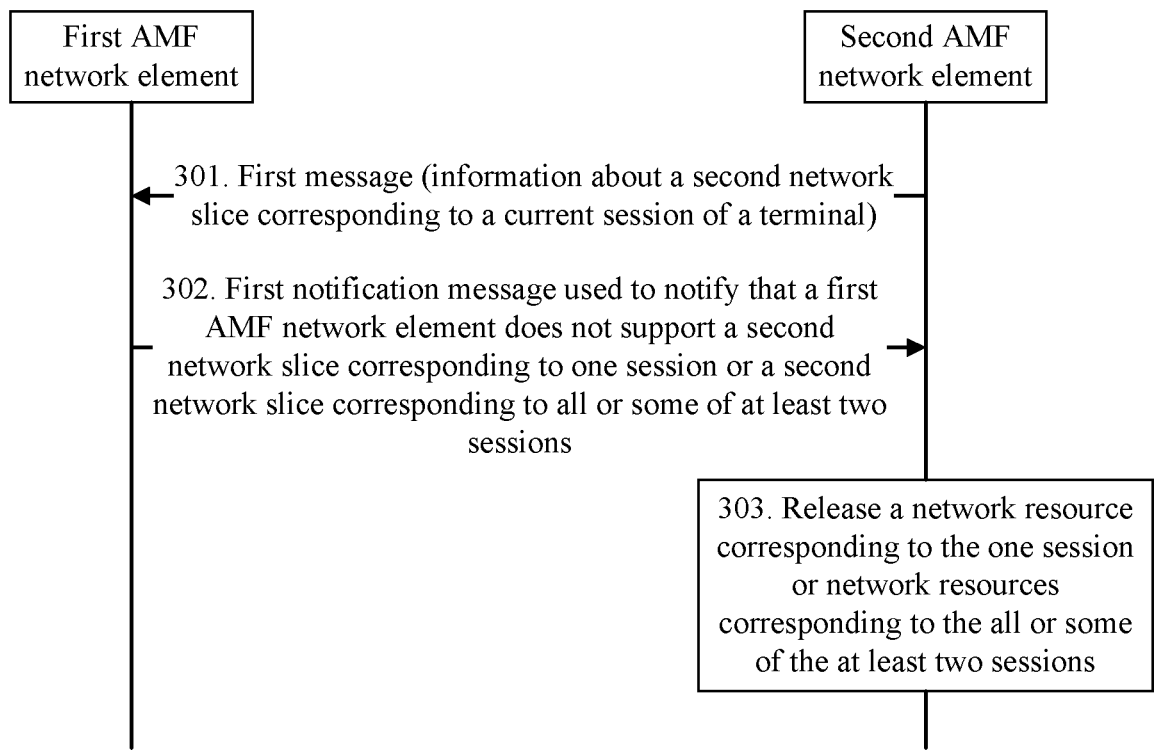
FIG. 3 is a schematic diagram of communication of a session handling method according to an embodiment of this application.
Figure 4:
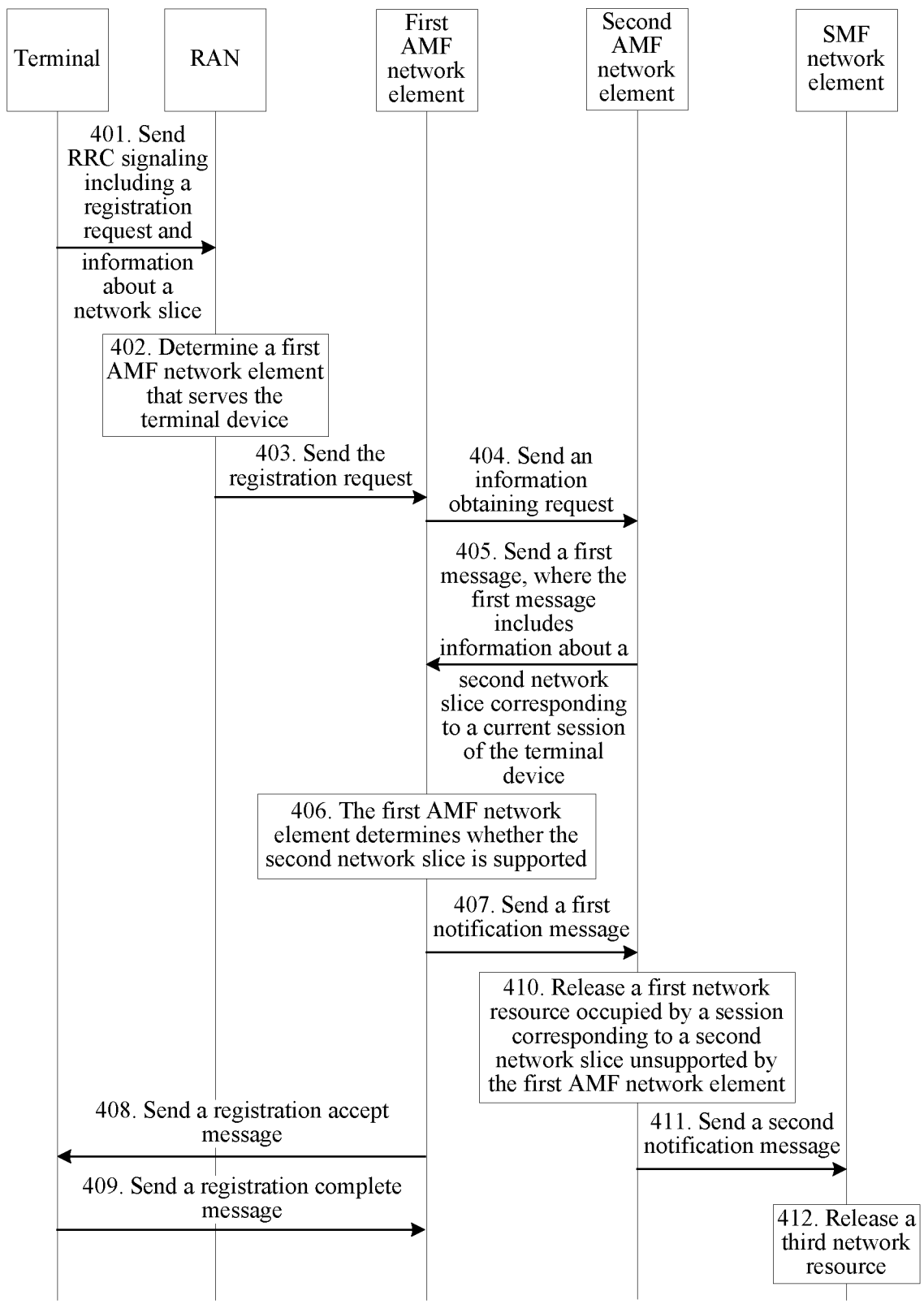
FIG. 4 is a schematic diagram of communication of another session handling method according to an embodiment of this application.
Figure 5A:
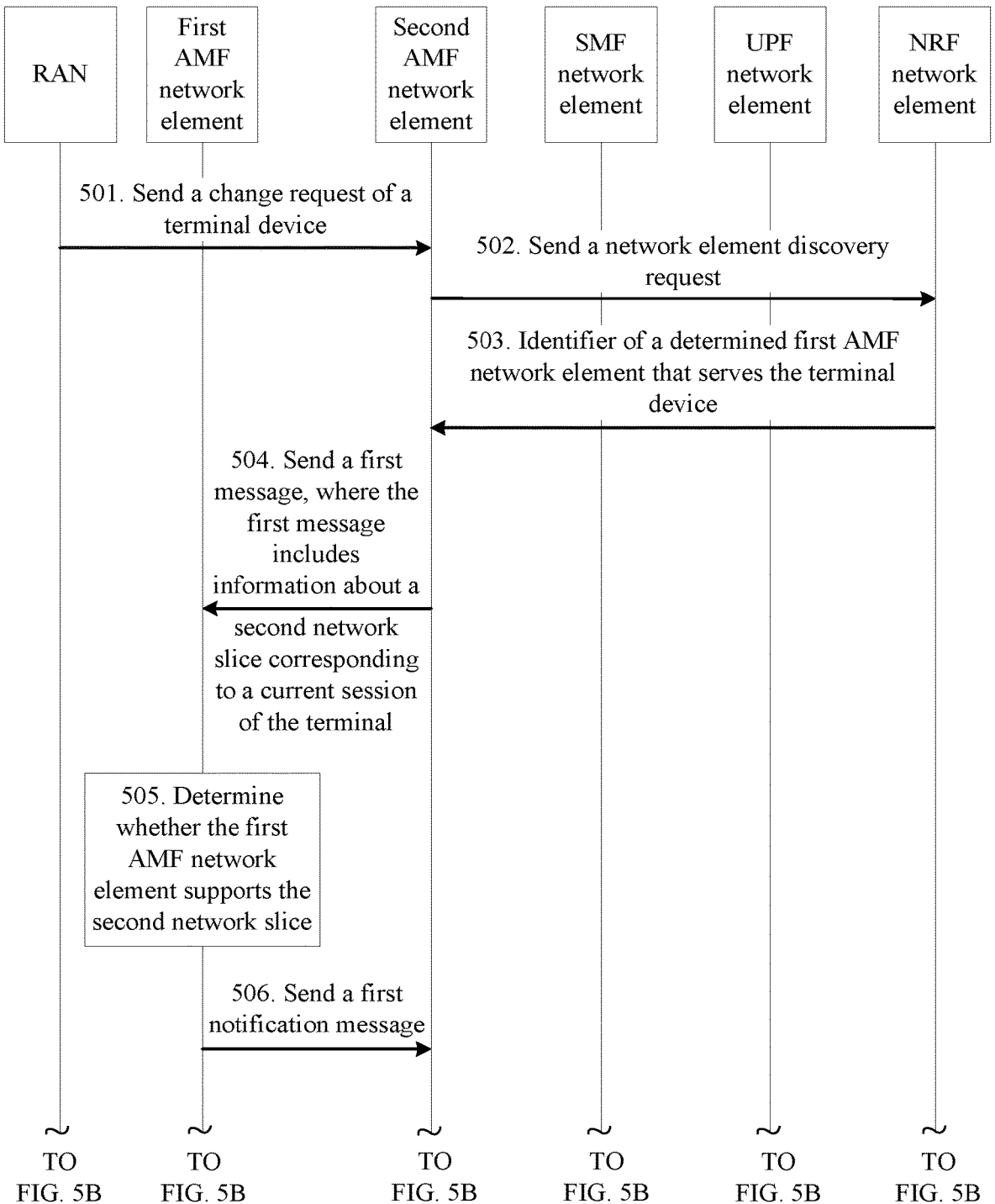
FIG. 5A and FIG. 5B are schematic diagrams of communication of still another session handling method according to an embodiment of this application.
Figure 5B:
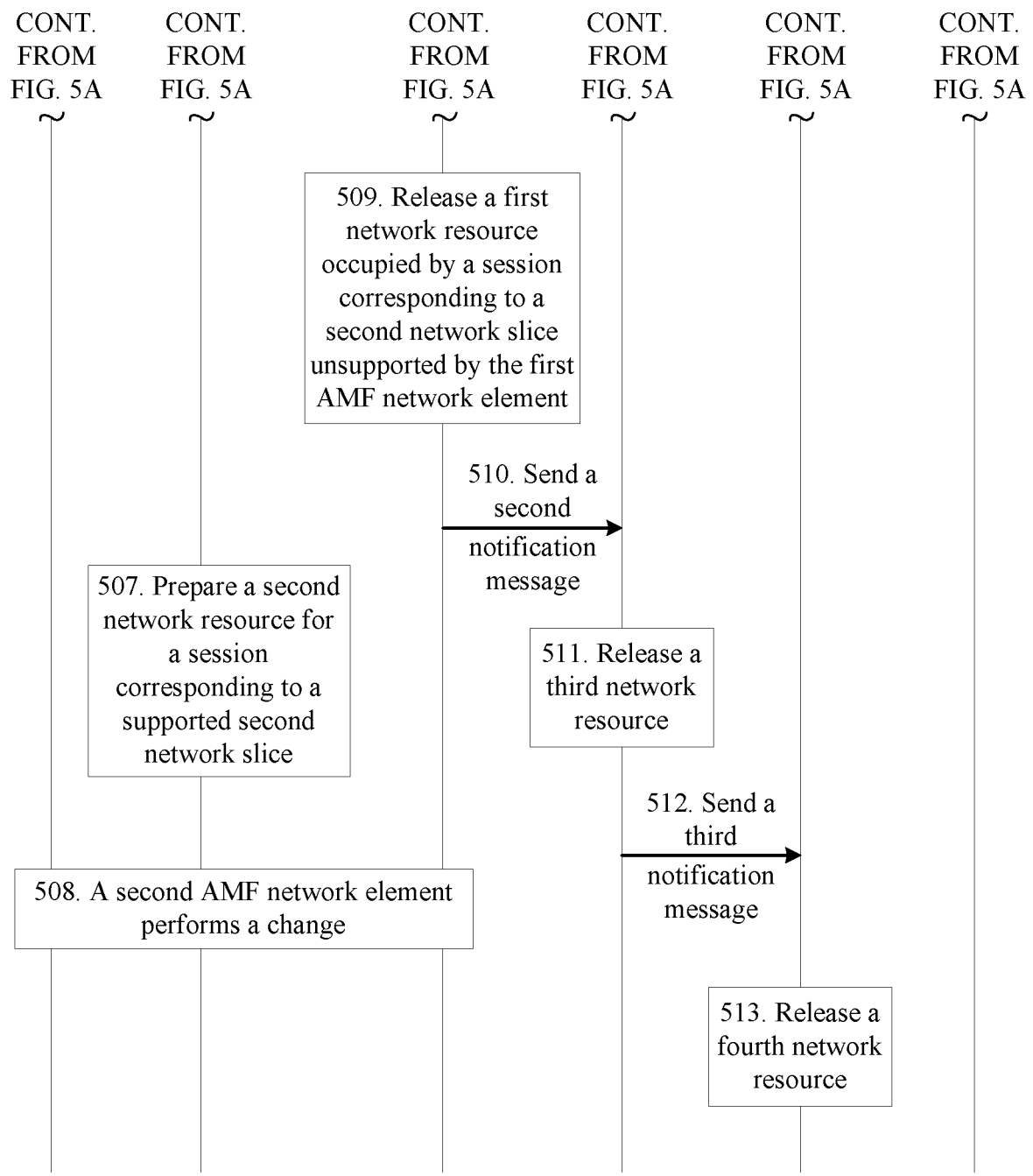

The following further details, with reference to FIG. 4, FIG. 5A, and FIG. 5B, the method shown in FIG. 3.

Based on the scenario diagram in FIG. 2A, referring to FIG. 4, FIG. 4 is a schematic flowchart of a session handling method according to an embodiment of this application. As shown in FIG. 4, the method is implemented through interaction between a first AMF network element, a second AMF network element, a terminal, a RAN, and an SMF network element. The terminal is in a connected state and the second AMF network element serves the terminal. After the terminal is changed from the connected state to an idle state, the RAN determines that the first AMF network element serves the terminal during the re-registering with a network of the terminal. The first AMF network element and the second AMF network element are different AMF network elements. For a session corresponding to a network slice unsupported by the first AMF network element, the second AMF network element and an SMF network element selected for the session by the second AMF network element still maintain a corresponding control-plane resource.

401. The terminal sends, to the RAN using radio resource control signaling, a registration request and information about a network slice corresponding to current sessions of the terminal.

The radio resource control (RRC) signaling may include the registration request and the information about the network slice corresponding to the current sessions of the terminal. For example, the information about the network slice corresponding to the current sessions of the terminal is S-NSSAI. The terminal sends the registration request to the RAN, using the RRC signaling, to register with a network. The terminal also adds the information about the network slice to the RRC signaling, such that the RAN determines, for the terminal, the first AMF network element that serves the terminal.

Optionally, the current sessions of the terminal may be the same as or different from sessions previously established in the second AMF network element. This is not limited in this embodiment of this application.

Correspondingly, the RAN receives the registration request and the information about the network slice corresponding to the current sessions of the terminal that are in the RRC signaling sent by the terminal.

402. The RAN determines the first AMF network element that serves the terminal.

The RAN selects an AMF network element from at least one or more AMF network elements based on the information about the network slice included in the RRC signaling. Additionally, the RAN determines the selected AMF network element as the first AMF network element.

In a first optional manner, the RAN may select any one of the at least one or more AMF network elements as the first AMF network element.

Alternatively, in a second optional manner, the RAN may select, from the at least one or more AMF network elements, an AMF network element that supports a network slice corresponding to all or some sessions of the current sessions, as the first AMF network element. In this case, the RAN selects the first AMF network element for the current sessions of the terminal after determining that the network slice is supported by the first AMF network element. This can increase a probability of successfully establishing sessions of the terminal in the first AMF network element.

Optionally, the RAN may determine information about a network slice supported by each of the at least one or more AMF network elements, in order to select, from the at least one or more AMF network elements, an AMF network element that supports a network slice corresponding to all or some sessions of the current sessions, as the first AMF network element.

For example, the current sessions of the terminal includes a first session, a second session, and a third session, where the first session corresponds to a first network slice, the second session corresponds to a second network slice, and the third session corresponds to a third network slice. If the at least one or more AMF network elements include an AMF network element that supports the first network slice, the second network slice, and the third network slice, the RAN selects the AMF network element that can support the three network slices as the first AMF network element. Alternatively, if the at least one or more AMF network elements include an AMF network element that can support a maximum of any two of the network slices, the RAN selects the AMF network element that can support the two network slices as the first AMF network element. Other cases are not listed. It can be learned that the RAN can determine the first AMF network element based on the network slice supported by the at least one or more AMF network elements and the network slice corresponding to the current sessions of the terminal.

403. The RAN sends the registration request to the first AMF network element.

For example, the RAN sends the registration request to the first AMF network element. The request carries an identifier of the second AMF network element that serves the terminal before the terminal sends the registration request and when the terminal is in a connected state. In this way, the first AMF network element can implement communication with the second AMF network element based on the identifier of the second AMF network element.

Correspondingly, the first AMF network element receives the registration request from the RAN.

404. The first AMF network element sends an information obtaining request to the second AMF network element.

For example, the first AMF network element sends the information obtaining request to the second AMF network element based on the identifier of the second AMF network element. For example, the information obtaining request may be a context obtaining request. Alternatively, the information obtaining request is a network slice information obtaining request. The obtaining request is used to obtain the information about the second network slice corresponding to the current sessions of the terminal.

Further, the information obtaining request carries an identifier of the terminal, such that the second AMF network element obtains, based on the identifier of the terminal, the information about the second network slice corresponding to the session of the terminal.

Correspondingly, the second AMF network element receives the information obtaining request sent by the first AMF network element.

405. The second AMF network element sends a first message to the first AMF network element, where the first message includes information about a second network slice corresponding to the current session of the terminal.

Optionally, if the information obtaining request is a context obtaining request, the first message further includes a mobility management context, a permanent identifier of the terminal, a session identifier, and an SMF network element identifier associated with the session identifier. The second AMF network element determines, based on the permanent identifier of the terminal and the session identifier, the current session of the terminal and a mobility management context corresponding to the session. The second AMF network element further determines, based on the SMF network element identifier associated with the session identifier, the information about the second network slice corresponding to the session. The information about the second network slice corresponding to the session is information about a network slice supported by an SMF network element.

After selecting the SMF network element for the session of the terminal, the second AMF network element performs associated storage on the session identifier and the SMF network element identifier associated with the session identifier. In this way, when receiving a data packet about the session, the second AMF network element can perform transmission using the SMF network element indicated by the corresponding SMF network element identifier. Additionally, the second AMF network element can store the information about the second network slice supported by the SMF network element, such that the second AMF network element determines the information about the network slice required by the session.

Optionally, the first message further includes a data network name (DNN) of each current session of the terminal. This way, when there is a supported session, the first AMF network element selects the SMF network element based on the DNN and the information about the supported second network slice corresponding to the session.

Correspondingly, the first AMF network element receives the first message sent by the second AMF network element.

406. The first AMF network element determines whether the first AMF network element supports a second network slice corresponding to one session or a second network slice corresponding to all or some of at least two sessions.

The current sessions of the terminal includes one session or at least two sessions. When the current sessions of the terminal include one session, the first AMF network element determines whether the first AMF network element supports a second network slice corresponding to the one session.

When the current sessions of the terminal include at least two sessions, the first AMF network element determines whether the first AMF network element supports a second network slice corresponding to all or some of the at least two sessions.

When determining that the first AMF network element supports the second network slice corresponding to the one session or the second network slice corresponding to all of the at least two sessions, the first AMF network element skips performing step 407 and performs step 408 of sending a registration accept message to the terminal by the first AMF network element.

When the first AMF network element determines that the first AMF network element supports a second network slice corresponding to some of the at least two sessions, herein, the some sessions supported are determined as a first portion session, and other sessions unsupported are determined as a second portion session. In this case, the first AMF network element performs step 407 of sending, to the second AMF network element, a first notification message notifying that the second network slice corresponding to the second portion session is unsupported. In addition, the first AMF network element performs step 408 of sending a registration accept message to the terminal.

When determining that the first AMF network element does not support the second network slice corresponding to the one session or a second network slice corresponding to all of the at least two sessions, the first AMF network element performs step 407 of sending, to the second AMF network element, a first notification message notifying that the second network slice corresponding to all the sessions is unsupported, and skips performing step 408.

Further, determining, by the first AMF network element, whether the first AMF network element supports a second network slice corresponding to any session includes determining, by the first AMF network element based on information about a first network slice supported by the first AMF network element, whether the information about the first network slice includes information about the second network slice corresponding to the session. When the information about the first network slice does not include the information about the second network slice, it indicates that the first AMF network element does not support the second network slice corresponding to the session. When the information about the first network slice includes the information about the second network slice, the first AMF network element obtains information about an allowed third network slice allocated to the terminal, and determines whether the information about the allowed third network slice includes the information about the second network slice corresponding to the session. If the information about the allowed third network slice does not include the information about the second network slice corresponding to the session, it indicates that the first AMF network element does not support the second network slice corresponding to the session. If the information about the allowed third network slice includes the information about the second network slice corresponding to the session, it indicates that the first AMF network element supports the network slice corresponding to the session. For example, the first AMF network element obtains, from a network slice selection function (NSSF) network element, the information about the allowed third network slice of the terminal. Optionally, different AMF network elements may obtain the same or different information about the allowed third network slice of the terminal. This is not limited in this embodiment of this application. In this embodiment of this application, the obtained information about the allowed third network slice allocated to the terminal is specific to the first AMF network element.

In other words, the first AMF network element determines, based on the information about the first network slice supported by the first AMF network element currently, whether the information about the first network slice includes the information about the second network slice corresponding to the session, to determine whether network slice deployment of the first AMF network element causes the first AMF network element not to support the second network slice. The first AMF network element then determines whether the information about the allowed third network slice includes the information about the second network slice corresponding to the session, to determine whether a policy causes the first AMF network element not to support the second network slice.

For example, the information about the first network slice supported by the first AMF network element includes a network slice A1, a network slice A2, and a network slice A3. Additionally, the information about the second network slice corresponding to the current sessions of the terminal is the network slice A1 corresponding to a first session, the network slice A3 corresponding to a second session, and a network slice A4 corresponding to a third session. Therefore, because the information about the network slice supported by the first AMF network element includes the network slice A1 and the network slice A3, the first AMF network element supports the network slice A1 corresponding to the first session and the network slice A3 corresponding to the second session.

407. When determining that the first AMF network element does not support the second network slice corresponding to the one session or the second network slice corresponding to all or some of the at least two sessions, the first AMF network element sends a first notification message to the second AMF network element.

The first notification message is used to notify the second AMF network element that the first AMF network element does not support the second network slice corresponding to the one session or the second network slice corresponding to all or some of the at least two sessions. This way, the second AMF network element can determine a second network slice corresponding to a session unsupported by the first AMF network element.

Optionally, when the first AMF network element determines that the first AMF network element does not support the second network slice corresponding to the one session or the second network slice corresponding to all or some of the at least two sessions, the first notification message may further carry indication information, for example, an unsupported slice. For example, the first notification message carries: indication information and an identifier of an unsupported session; indication information and an SMF network element identifier associated with an identifier of an unsupported session; or indication information, an identifier of an unsupported session, and an SMF network element identifier associated with the identifier of the unsupported session.

Optionally, the first notification message may be indicated using an information element (IE), a flag, a cause value, or the like. This is not limited in this embodiment of this application. For example, the first notification message is a preset first cause value, and the first cause value is used to indicate that the first AMF network element does not support a network slice corresponding to a session.

For example, it is assumed that the current sessions of the terminal include a first session, a second session, and a third session. The first AMF network element may serve the first session and the second session, and determine that the first AMF network element does not support a network slice corresponding to the third session. The first notification message sent by the first AMF network element to the second AMF network element includes an identifier of the third session and a corresponding first cause value.

Optionally, the first AMF network element determines that the first AMF network element supports a second network slice corresponding to some of the at least two sessions. Herein, the sessions supported are determined as a first portion session, and other sessions unsupported are determined as a second portion session. In a possible solution, the first notification message may include at least one of a session identifier of the first portion session or an SMF network element identifier associated with the session identifier of the first portion session. Optionally, indication information may alternatively be carried, for example, a supported slice. Because the second AMF network element knows session identifiers of a plurality of current sessions of the terminal, the second AMF network element can also determine, using the first notification message notifying that the second network slice is supported, a second network slice unsupported by the first AMF network element. In another possible solution, the first notification message may include at least one of a session identifier of the second portion session or an SMF network element identifier associated with the session identifier of the second portion session. Optionally, indication information may alternatively be carried, for example, an unsupported slice. In still another possible solution, the first notification message may include at least one of a session identifier of the supported first portion session or an SMF network element identifier associated with the session identifier of the first portion session, and may further include at least one of a session identifier of the unsupported second portion session or an SMF network element identifier associated with the session identifier of the second portion session, This way, the second AMF network element directly determines the supported second network slice and the unsupported second network slice.

Correspondingly, the second AMF network element receives the first notification message sent by the first AMF network element.

408. The first AMF network element sends a registration accept message to the terminal.

Optionally, the first AMF network element may allocate a temporary identifier to the terminal. Additionally, the first AMF network element may add the new temporary identifier to the registration accept message, to send the new temporary identifier to the terminal.

Optionally, before performing step 408, the first AMF network element may further perform security authentication on the terminal. The security authentication includes terminal authentication, multi-user authentication, multi-user use grant, and policy authentication, and further includes encryption and integrity protection on a signaling-plane message of the terminal.

409. The terminal sends a registration complete message to the first AMF network element.

For example, when the registration accept message carries the temporary identifier allocated to the terminal by the first AMF network element, the terminal sends the registration complete message to the first AMF network element.

It should be noted that, in this embodiment of this application, communication data between the first AMF network element or the second AMF network element and the terminal is forwarded by the RAN.

410. The second AMF network element releases a first network resource corresponding to the one session or first network resources corresponding to all or some of the at least two sessions.

For example, after step 407 of determining, by the second AMF network element, that the first AMF network element does not support the second network slice corresponding to the one session or the second network slice corresponding to all or some of the at least two sessions, the second AMF network element releases a first network resource corresponding to the unsupported session.

For any unsupported session, the first network resource released by the second AMF network element includes a control-plane storage resource corresponding to the session. For example, the second AMF network element stores a session identifier of a session, an SMF network element identifier associated with the session identifier, information about a network slice corresponding to the SMF network element, and the like. Additionally, the second AMF network element releases the first network resource based on the received first notification message, to reduce a waste of network resources.

In an optional manner, when the second AMF network element receives the first notification message, the second AMF network element immediately releases the first network resource corresponding to the unsupported session. Alternatively, in another optional manner, when the second AMF network element receives the first notification message, the second AMF network element releases, after a preset time period elapses, the first network resource corresponding to the unsupported session. For example, the second AMF network element starts a timer. After timing of the timer is completed, the second AMF network element releases first network resources corresponding to all or some sessions, to avoid a "ping-pong effect" of the terminal, to be more specific, to prevent a terminal location from being changed frequently and thereby avoid increasing core-network signaling load.

For example, if the terminal moves from a service area of the first AMF network element to that of the second AMF network element when timing of the timer has not completed, the second AMF network element can reuse the first network resource corresponding to the previously unsupported session of the terminal. In this way, the timer is used to prevent the second AMF network element from re-establishing the unsupported session and allocating the required network resource, thereby reducing a core network signaling waste.

For another example, the terminal moves to a service area of the first AMF network element in a timing process of the timer. After timing of the timer is completed, the second AMF network element releases a first network resource corresponding to an unsupported session or unsupported sessions.

When the second AMF network element releases the first network resources corresponding to the unsupported sessions, the second AMF network element performs step 411 to notify an SMF network element associated with each session of the unsupported session.

411. When releasing the first network resource corresponding to the one session or the first network resources corresponding to all or some of the at least two sessions, the second AMF network element sends a second notification message to an SMF network element associated with a session identifier of the one session or SMF network elements associated with session identifiers of all or some of the at least two sessions.

The second notification message is used to notify the SMF network element that the terminal has moved out of a slice service area of the second AMF network element. To be more specific, when determining to release the first network resource, the second AMF network element instructs, using the notification message, the SMF network element to release a third network resource to reduce a waste of network resources on an SMF network element side.

Optionally, the second AMF network element may determine, based on a correspondence between a session identifier and an SMF network element identifier, an SMF network element that provides a session service for the session. Further, the second AMF network element may send a second notification message to the corresponding SMF network element, and carry a session identifier of the session, such that the SMF network element releases a third network resource occupied by the session. For example, a session previously served by the second AMF network element for terminal includes a first session and a second session, where the first session corresponds to the first SMF network element, and the second session corresponds to the second SMF network element. Therefore, when the terminal has moved out of the slice service area of the second AMF network element, the second AMF network element sends a second notification message to the first SMF network element and the second SMF network element. The second notification message sent to the first SMF network element carries a session identifier of the first session, and the second notification message sent to the second SMF network element carries a session identifier of the second session. As such, each SMF network element releases a third network resource, thereby reducing a waste of network resources on all SMF network element sides.

Correspondingly, the SMF network element receives the second notification message from the second AMF network element.

412. The SMF network element releases a third network resource occupied by a session, associated with the SMF network element, of the terminal.

For example, when receiving the second notification message, the SMF network element releases the third network resource occupied by the session, associated with the SMF network element, of the terminal, to reduce a waste of network resources on an SMF network element side.

It should be noted that the SMF network element herein is any one of the at least one SMF network element to be notified by the second AMF network element. Another SMF network element to be notified by the second AMF network element may release a corresponding network resource according to a solution in step 411.

The third network resource released by the SMF network element includes a session context indicated by a session identifier corresponding to the SMF network element identifier. The session context includes information such as a DNN, and QoS flow, and includes a transmission resource (for example, a transport layer address or a tunnel address) or the like. The third network resource is released by receiving the second notification message, to reduce a waste of third network resources.

In an optional manner, when receiving the second notification message, the SMF network element immediately releases the third network resource occupied by the session associated with the SMF network element.

In this embodiment of this application, the first AMF network element sends, to the second AMF network element, the first notification message notifying that the first AMF network element does not support the second network slice corresponding to the session of the terminal. This way, after the second AMF network element receives the first notification message, the second AMF network element can release the network resource occupied by the session, thereby reducing a waste of network resources. In addition, the second AMF network element notifies the SMF network element that the terminal has moved out of the service area of the second AMF network element. As such, the SMF network element can release the network resource occupied by the session, thereby further reducing a waste of network resources.

Based on the scenario diagram in FIG. 2B, referring to FIG. 5A and FIG. 5B, FIG. 5A and FIG. 5B are schematic flowcharts of a session handling method according to an embodiment of this application. As shown in FIG. 5A and FIG. 5B, the method is implemented through interaction between a first AMF network element, a second AMF network element, a terminal, a RAN, an NRF network element, an SMF network element, and a UPF network element. In a scenario in which the terminal needs to change an AMF network element, the second AMF network element is an AMF network element that serves the terminal before the change, and the first AMF network element is an AMF network element that is determined by the NRF network element and that the terminal is to be changed to. The first AMF network element and the second AMF network element are different AMF network elements. For a session corresponding to a network slice unsupported by the first AMF network element, the second AMF network element and an SMF network element selected for the session by the second AMF network element still maintain a corresponding control-plane resource, and a UPF network element selected for the session by the second AMF network element still maintains a corresponding user-plane resource.

501. The RAN sends a change request of the terminal to the second AMF network element.

For example, when an AMF network element needs to be changed for the terminal due to a location change, load balance, or the like of the terminal, the RAN sends the change request of the terminal to the second AMF network element.

502. The second AMF network element sends a network element discovery request to the NRF network element.

For example, the network element discovery request is a network function (NF) discovery request. The network element discovery request includes an identifier of the terminal, such that the NRF network element determines an AMF network element that serves the terminal.

Correspondingly, the NRF network element receives the network element discovery request sent by the second AMF network element, and determines the first AMF network element that serves the terminal.

In a first optional manner, the NRF network element may select any one of at least one or more AMF network elements as the first AMF network element.

Alternatively, in a second optional manner, the NRF network element may select, from at least one or more AMF network elements, an AMF network element that supports a network slice corresponding to all or some sessions of a current session, as the first AMF network element. In this case, the first AMF network element is selected for the current sessions of the terminal after the network slice supported by the AMF network element is determined. This can increase a probability of successfully establishing the session of the terminal by the first AMF network element.

Optionally, the NRF network element may determine information about a network slice supported by each of at least one or more AMF network elements, in order to select, from the at least one or more AMF network elements, an AMF network element that supports a network slice corresponding to all or some sessions of a current session, as the first AMF network element.

503. The NRF network element sends, to the second AMF network element, an identifier of the determined first AMF network element that serves the terminal.

Correspondingly, the second AMF network element receives the identifier of the first AMF network element sent by the NRF network element.

Optionally, the identifier of the first AMF network element is carried in a network element discovery response. For example, the network element discovery response is an NF discovery response.

504. The second AMF network element sends a first message to the first AMF network element, where the first message includes information about a second network slice corresponding to a current session of the terminal.

For example, the second AMF network element sends the first message to the first AMF network element based on the identifier of the first AMF network element sent by the NRF network element.

Optionally, the first message may be a redirection request, for example, a relocation request.

Optionally, the first message further includes a session identifier and an SMF network element identifier associated with the session identifier. The second AMF network element determines, based on the session identifier, a current session of the terminal, and further determines, based on the SMF network element identifier associated with the session identifier, information about a second network slice corresponding to the session. The information about the second network slice corresponding to the session is information about a network slice supported by an SMF network element.

After selecting the SMF network element for the session of the terminal, the second AMF network element performs associated storage on the session identifier and the SMF network element identifier associated with the session identifier. In this way, when receiving a data packet about the session, the second AMF network element can perform transmission using the SMF network element indicated by the corresponding SMF network element identifier. Additionally, the second AMF network element can store the information about the second network slice supported by the SMF network element, such that the second AMF network element determines the information about the network slice required by the session.

Optionally, the first message further includes a DNN of each current session of the terminal. As such, when there is a supported session, the first AMF network element selects an SMF network element based on the DNN and the information about the supported second network slice corresponding to the session.

Correspondingly, the first AMF network element receives the first message sent by the second AMF network element.

505. The first AMF network element determines whether the first AMF network element supports a second network slice corresponding to one session or a second network slice corresponding to all or some of at least two sessions.

The current sessions of the terminal include one session or at least two sessions. When the current sessions of the terminal include one session, the first AMF network element determines whether the first AMF network element supports a second network slice corresponding to the one session. When the current sessions of the terminal include at least two sessions, the first AMF network element determines whether the first AMF network element supports a second network slice corresponding to all or some of the at least two sessions.

When determining that the first AMF network element supports the second network slice corresponding to the one session or a second network slice corresponding to all of the at least two sessions, the first AMF network element skips performing step 506 of sending a first notification message to the second AMF network element by the first AMF network element. Instead, the first AMF network element performs step 507 of preparing, by the first AMF network element, a second network resource for a session corresponding to a supported second network slice.

When the first AMF network element determines that the first AMF network element supports a second network slice corresponding to some of the at least two sessions, herein, the some sessions supported are determined as a first portion session, and other sessions unsupported are determined as a second portion session. In this case, the first AMF network element performs step 506 of sending, to the second AMF network element, the first notification message notifying that the second network slice corresponding to the second portion session is unsupported. In addition, the first AMF network element performs step 507 of preparing a second network resource for a session corresponding to a supported second network slice.

When determining that the first AMF network element does not support the second network slice corresponding to the one session or the second network slice corresponding to all of the at least two sessions, the first AMF network element performs step 506 of sending, to the second AMF network element, a first notification message notifying that the second network slice corresponding to all the sessions is unsupported, and skips performing step 506.

For a manner of step 505 of determining whether the first AMF network element supports the second network slice corresponding to the one session or the second network slice corresponding to all or some of the at least two sessions, refer to detailed descriptions of step 406 in the embodiment shown in FIG. 4. Details are not described herein again.

506. When determining that the first AMF network element does not support the second network slice corresponding to the one session or the second network slice corresponding to all or some of the at least two sessions, the first AMF network element sends a first notification message to the second AMF network element.

For detailed descriptions of step 506, refer to step 407 in the embodiment shown in FIG. 4. Details are not described herein again.

507. The first AMF network element prepares a second network resource for a session corresponding to a supported second network slice.

For example, in each case in which step 408 is performed and that is described in step 507, the first AMF network element prepares the second network resource for the session corresponding to the supported second network slice. The first AMF network element saves the SMF network element identifier, the session identifier, and information about the network slice. The first AMF network element selects a new SMF network element for the session of the terminal from connected SMF network elements. If the new SMF network element is different from an old SMF network element selected by the second AMF network element, a session context of the session supported by the terminal needs to be synchronized between the new SMF network element and the old SMF network element. The session context includes information such as a session identifier, a DNN, and a QoS flow. The new SMF network element selects a new UPF network element for the terminal, and the new UPF network element needs to prepare a user-plane transmission resource, for example, a transport layer address or a tunnel address, based on an indication from the new SMF network element.

For example, the first AMF network element may select an SMF network element based on the DNN carried in the first message and the information about the supported second network slice corresponding to the session.

508. The second AMF network element performs a change.

After receiving the first notification message sent by the first AMF network element, the second AMF network element makes the change. For example, the second AMF network element sends a change request to a source RAN connected to the second AMF network element, and the source RAN sends a change command to the terminal. The change command carries an identifier used to identify a target RAN. After receiving the change command, the terminal starts to initiate a connection establishment request to the target RAN, and the source RAN (to be more specific, the RAN that sends the change request in this embodiment of this application) synchronizes a transmitter status, for example, a sequence number or a buffer queue, with the target RAN. After being connected to the target RAN successfully, the terminal sends a change confirmation message to the first AMF network element using the target RAN. After receiving the change confirmation message, the first AMF network element updates the second network resource for the SMF network element selected for the terminal and the UPF network element corresponding to the SMF network element, to ensure that both uplink data and downlink data can be transmitted in a tunnel.

509. The second AMF network element releases a first network resource corresponding to the one session or first network resources corresponding to all or some of the at least two sessions.

For example, after step 506 of determining, by the second AMF network element, that the first AMF network element does not support the second network slice corresponding to the one session or the second network slice corresponding to all or some of the at least two sessions, the second AMF network element releases a first network resource corresponding to the unsupported session, to reduce a waste of network resources.

For an implementation of step 509 of releasing a first network resource by the second AMF network element, refer to detailed descriptions of step 410 in the embodiment shown in FIG. 4. Details are not described herein again.

510. When releasing the first network resource corresponding to the one session or the first network resources corresponding to all or some of the at least two sessions, the second AMF network element sends a second notification message to an SMF network element associated with a session identifier of the one session or SMF network elements associated with session identifiers of all or some of the at least two sessions.

Correspondingly, the SMF network element receives the second notification message from the second AMF network element.

For detailed descriptions of step 510, refer to step 411 in the embodiment shown in FIG. 4. Details are not described herein again.

511. The SMF network element releases a third network resource occupied by a session, associated with the SMF network element, of the terminal.

For detailed descriptions of step 511, refer to step 412 in the embodiment shown in FIG. 4. Details are not described herein again.

512. The SMF network element sends a third notification message to a UPF network element associated with the session identifier of the session. The third notification message is used to notify the UPF network element that the terminal has moved out of a slice service area of the second AMF network element.

For example, when releasing the third network resource occupied by the session associated with the SMF network element, the SMF network element sends the third notification message to the UPF network element associated with the session identifier of the session. The UPF network element is notified, such that the UPF network element releases a fourth network resource, thereby reducing a waste of network resources on a UPF network element side.

Optionally, the SMF network element may determine, based on a correspondence between a session identifier and a UPF network element identifier, a UPF network element that serves the session. Further, the SMF network element can send the third notification message to the corresponding UPF network element that carries a session identifier of the session, such that the UPF network element releases a fourth network resource occupied by the session, thereby reducing a waste of network resources on a UPF network element side.

Correspondingly, the UPF network element receives the third notification message from the SMF network element.

513. The UPF network element releases a fourth network resource occupied by a session, associated with the UPF network element, of the terminal.

The UPF network element determines, based on the session identifier carried in the third notification message, the fourth network resource occupied by the session indicated by the session identifier, for example, a user-plane transmission resource related to the session, for example, a transport layer address or a tunnel address. The fourth network resource is released by receiving the third notification message, to reduce a waste of fourth network resources.

In this embodiment of this application, the first AMF network element sends, to the second AMF network element, the first notification message notifying that the first AMF network element does not support the second network slice corresponding to the session of the terminal. As such, after the second AMF network element receives the first notification message, the second AMF network element can be triggered in a timely manner to release the network resource occupied by the session, thereby reducing a waste of network resources. In addition, the second AMF network element notifies the SMF network element that the terminal has moved out of the service area of the second AMF network element, such that the SMF network element is triggered in a timely manner to release the network resource occupied by the session, thereby further reducing a waste of network resources. In addition, the SMF network element notifies the UPF network element that the terminal has moved out of the service area of the second AMF network element, such that the UPF network element is triggered in a timely manner to release the network resource occupied by the session, thereby further reducing a waste of network resources.

An embodiment of this application further provides another session handling Kmethod and a first AMF network element, a second AMF network element, an SMF network element, a UPF network element, and a system that are based on the method. The method includes: obtaining, by a second AMF, information about a second network slice corresponding to a current session of a terminal, where the session includes one session or at least two sessions; receiving, by the second AMF network element, a first message from a network device, where the first message includes an identifier of a first AMF network element that a session is to be changed to; and when determining that the first AMF network element does not support a second network slice corresponding to the one session or a second network slice corresponding to all or some of the at least two sessions, releasing, by the second AMF network element, a network resource corresponding to the one session or network resources corresponding to all or some of the at least two sessions. The network resource corresponding to the one session or the network resources corresponding to all or some of the at least two sessions may be referred to as a first network resource.

Figure 6A:
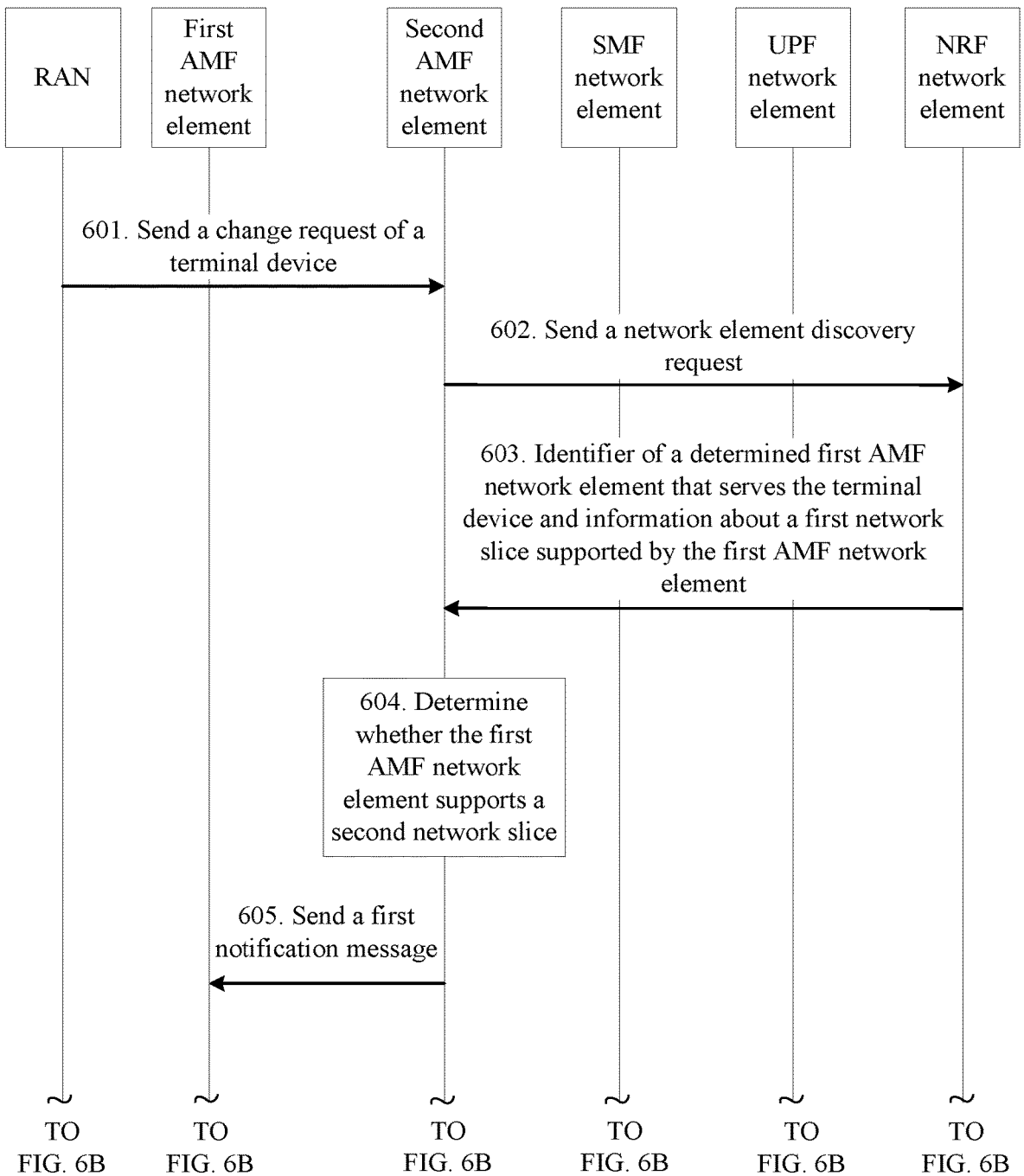
FIG. 6A and FIG. 6B are schematic diagrams of communication of still another session handling method according to an embodiment of this application.
Figure 6B:
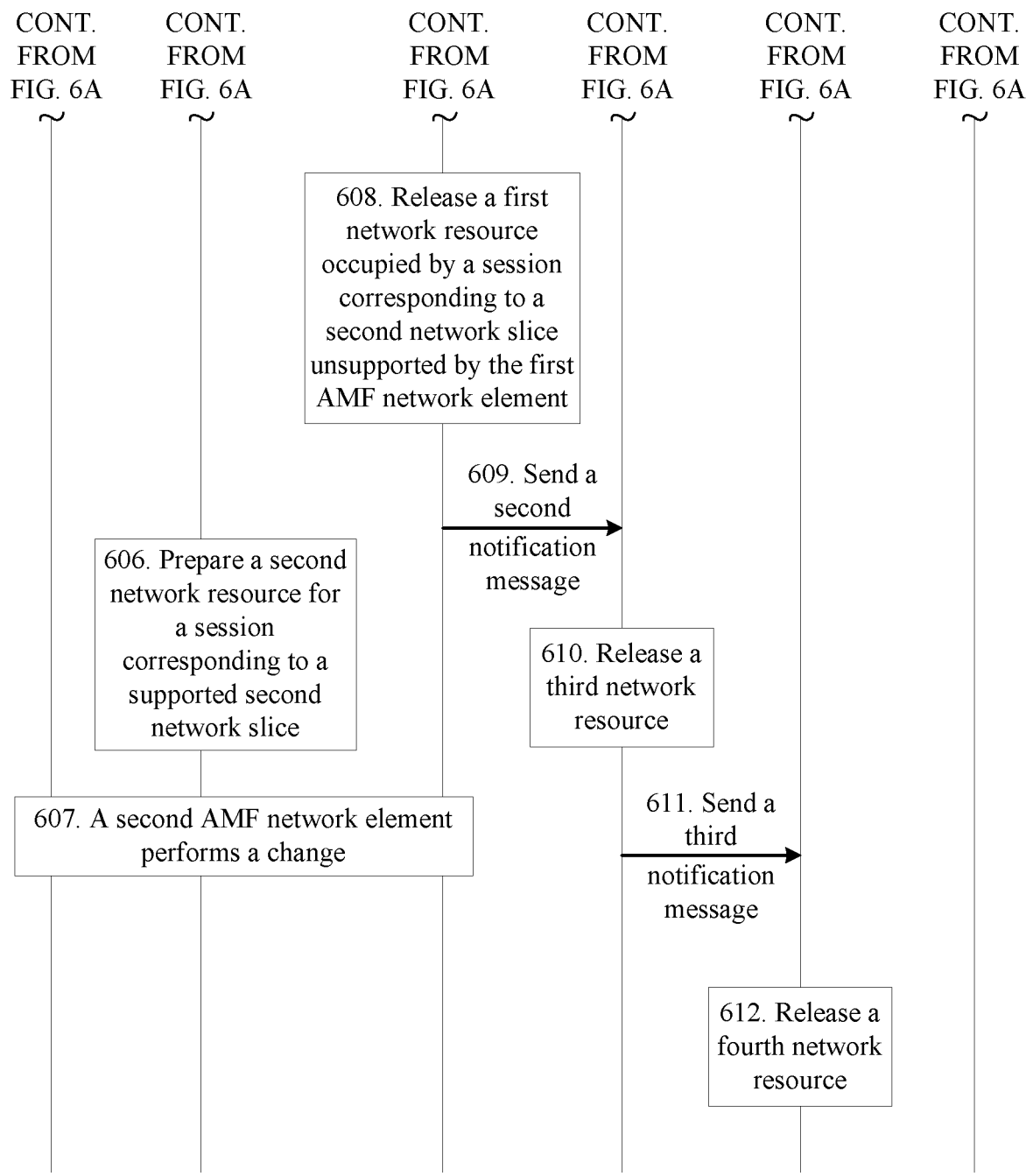

The following further describes another session handling method with reference to FIG. 6A and FIG. 6B.

Based on the scenario diagram in FIG. 2B, referring to FIG. 6A and FIG. 6B, FIG. 6A and FIG. 6B are schematic flowcharts of a session handling method according to an embodiment of this application. As shown in FIG. 6A and FIG. 6B, the method is implemented through interaction between a first AMF network element, a second AMF network element, a terminal, a RAN, an NRF network element, an SMF network element, and a UPF network element. In a scenario in which the terminal needs to change an AMF network element, the second AMF network element is an AMF network element that serves the terminal before the change, and the first AMF network element is an AMF network element that is determined by the NRF network element and that the terminal is to be changed to. The first AMF network element and the second AMF network element are different AMF network elements. For a session corresponding to a network slice unsupported by the first AMF network element, an SMF network element selected for the session by the second AMF network element still maintains a corresponding control-plane resource, and a UPF network element selected for the session by the second AMF network element still maintains a corresponding user-plane resource.

601. The RAN sends a change request of the terminal to the second AMF network element.

602. The second AMF network element sends a network element discovery request to the NRF network element.

603. The NRF network element sends, to the second AMF network element, an identifier of the determined first AMF network element that serves the terminal and information about a first network slice supported by the first AMF network element.

For descriptions of step 601, step 602, and step 603, refer to step 501, step 502, and step 503 in the embodiment shown in FIG. 5A. Details are not described herein again.

604. The second AMF network element determines whether the first AMF network element supports a second network slice corresponding to one session or a second network slice corresponding to all or some of at least two sessions.

The current session of the terminal includes one session or at least two sessions. When the current session of the terminal includes one session, the first AMF network element determines whether the first AMF network element supports a second network slice corresponding to the one session. When the current session of the terminal includes at least two sessions, the first AMF network element determines whether the first AMF network element supports a second network slice corresponding to all or some of the at least two sessions.

When determining that the first AMF network element supports the second network slice corresponding to the one session or a second network slice corresponding to all of the at least two sessions, the second AMF network element performs step 605 of sending a first notification message to the first AMF network element. Additionally, the second AMF network element skips performing step 608 of releasing, by the second AMF network element, a first network resource occupied by a session corresponding to a second network slice unsupported by the first AMF network element.

When the second AMF network element determines that the first AMF network element supports a second network slice corresponding to some of the at least two sessions, herein, the some sessions supported are determined as a first portion session, and other sessions unsupported are determined as a second portion session. In this case, the second AMF network element performs step 605 of sending a first notification message to the first AMF network element by the second AMF network element. The second AMF network element also performs step 608 of releasing, by the second AMF network element, a first network resource occupied by a session corresponding to a second network slice unsupported by the first AMF network element.

When determining that the first AMF network element does not support the second network slice corresponding to the one session or the second network slice corresponding to all of the at least two sessions, the second AMF network element skips performing step 605 of sending, by the second AMF network element to the first AMF network element, a first notification message notifying the second network slice corresponding to all or some of the session supported by the first AMF network element.

For a manner of performing step 604 of determining, by the second AMF network element, whether the first AMF network element supports a second network slice corresponding to one session or a second network slice corresponding to all or some of the at least two sessions, refer to detailed descriptions of step 406 in the embodiment shown in FIG. 4. A difference between the two steps is that the two steps are performed by different entities: Step 604 is performed by the second AMF network element, and step 406 is performed by the first AMF network element. Details are not described herein again.

605. When determining that the first AMF network element supports the second network slice corresponding to the one session or the second network slice corresponding to all or some of the at least two sessions, the second AMF network element sends a first notification message to the first AMF network element.

The first notification message is used to notify the first AMF network element that the first AMF network element supports the second network slice corresponding to the one session or the second network slice corresponding to all or some of the at least two sessions. As such, the first AMF network element can determine a second network slice supported by the first AMF network element.

Optionally, when the second AMF network element determines that the first AMF network element supports the second network slice corresponding to the one session or the second network slice corresponding to all or some of the at least two sessions, the first notification message may further carry indication information, for example, a supported slice. For example, the first notification message carries: indication information and a supported session identifier; indication information and an SMF network element identifier associated with a supported session identifier; or indication information, a supported session identifier, and an SMF network element identifier associated with the supported session identifier.

Optionally, the first notification message may be indicated using an information element (IE), a flag, a cause value, or the like. This is not limited in this embodiment of this application. For example, the first notification message is a preset first cause value, and the first cause value is used to indicate that the first AMF network element supports the network slice corresponding to the session.

For example, it is assumed that the current session of the terminal includes a first session, a second session, and a third session. The first AMF network element may serve the first session and the second session, and determine that the first AMF network element does not support a network slice corresponding to the third session. In this case, the first notification message sent by the second AMF network element to the first AMF network element includes an identifier of the first session, an identifier of the second session, and a corresponding first cause value.

Optionally, the first notification message carries a DNN of the session corresponding to the second network slice supported by the first AMF network element. This way, the first AMF network element selects an SMF network element based on the DNN and the information about the supported second network slice corresponding to the session.

Correspondingly, the first AMF network element receives the first notification message sent by the second AMF network element.

606. The first AMF network element prepares a second network resource for a session corresponding to the supported second network slice.

607. The second AMF network element performs a change.

For descriptions of step 606 and step 607, refer to step 507 and step 508 in the embodiment shown in FIG. 5B. Details are not described herein again.

608. The second AMF network element releases a first network resource corresponding to the one session or first network resources corresponding to all or some of the at least two sessions.

For example, after step 604 of determining, by the second AMF network element, that the first AMF network element does not support the second network slice corresponding to the one session or the second network slice corresponding to all or some of the at least two sessions, the second AMF network element releases a first network resource corresponding to the unsupported session, to reduce a waste of network resources.

In an optional manner, when the second AMF network element sends the first notification message to the first AMF network element, the second AMF network element immediately releases the first network resource corresponding to the unsupported session. Alternatively, in another optional manner, when the second AMF network element sends the first notification message to the first AMF network element, the second AMF network element releases, after a preset time period elapses, the first network resource corresponding to the unsupported session.

For descriptions of step 608 of releasing a first network resource by the second AMF network element, refer to detailed descriptions of step 410 in the embodiment shown in FIG. 4. Details are not described herein again.

609. When releasing the first network resource corresponding to the one session or the first network resources corresponding to all or some of the at least two sessions, the second AMF network element sends a second notification message to an SMF network element associated with a session identifier of the one session or SMF network elements associated with session identifiers of all or some of the at least two sessions.

Correspondingly, the SMF network element receives the second notification message from the second AMF network element.

For detailed descriptions of step 609, refer to step 411 in the embodiment shown in FIG. 4. Details are not described herein again.

610. The SMF network element releases a third network resource occupied by a session, associated with the SMF network element, of the terminal.

For detailed descriptions of step 610, refer to step 412 in the embodiment shown in FIG. 4. Details are not described herein again.

611. The SMF network element sends a third notification message to a UPF network element associated with a session identifier of the session. The third notification message is used to notify the UPF network element that the terminal has moved out of a slice service area of the second AMF network element.

Correspondingly, the UPF network element receives the third notification message from the SMF network element.

612. The UPF network element releases a fourth network resource occupied by a session, associated with the UPF network element, of the terminal.

For detailed descriptions of step 611 and step 612, refer to step 512 and step 513 in the embodiment shown in FIG. 5B. Details are not described herein again.

In this embodiment of this application, the second AMF determines that the first AMF network element does not support the second network slice corresponding to all or some of the sessions of the terminal, such that the second AMF network element can release the network resource occupied by the unsupported session, thereby reducing a waste of network resources. In addition, the second AMF network element notifies the SMF network element that the terminal has moved out of the service area of the second AMF network element, such that the SMF network element is triggered in a timely manner to release the network resource occupied by the session, thereby further reducing a waste of network resources.

An embodiment of this application further provides still another session handling method and a first AMF network element, a second AMF network element, an SMF network element, a UPF network element, and a system that are based on the method. The method includes: obtaining, by a second AMF, information about a second network slice corresponding to a current session of a terminal, where the session includes one session or at least two sessions; receiving, by the second AMF network element, a first message from a network device, where the first message includes information about a first network slice supported by a first AMF network element; and when determining that the information about the first network slice does not include information about a second network slice corresponding to a second session, releasing, by the second AMF network element, a network resource corresponding to the second session, where the second session is included in the session, and a session in the session exclusive of the second session is the first session. The network resource corresponding to the one session or the network resources corresponding to all or some of the at least two sessions may be referred to as a first network resource.

Figure 7:
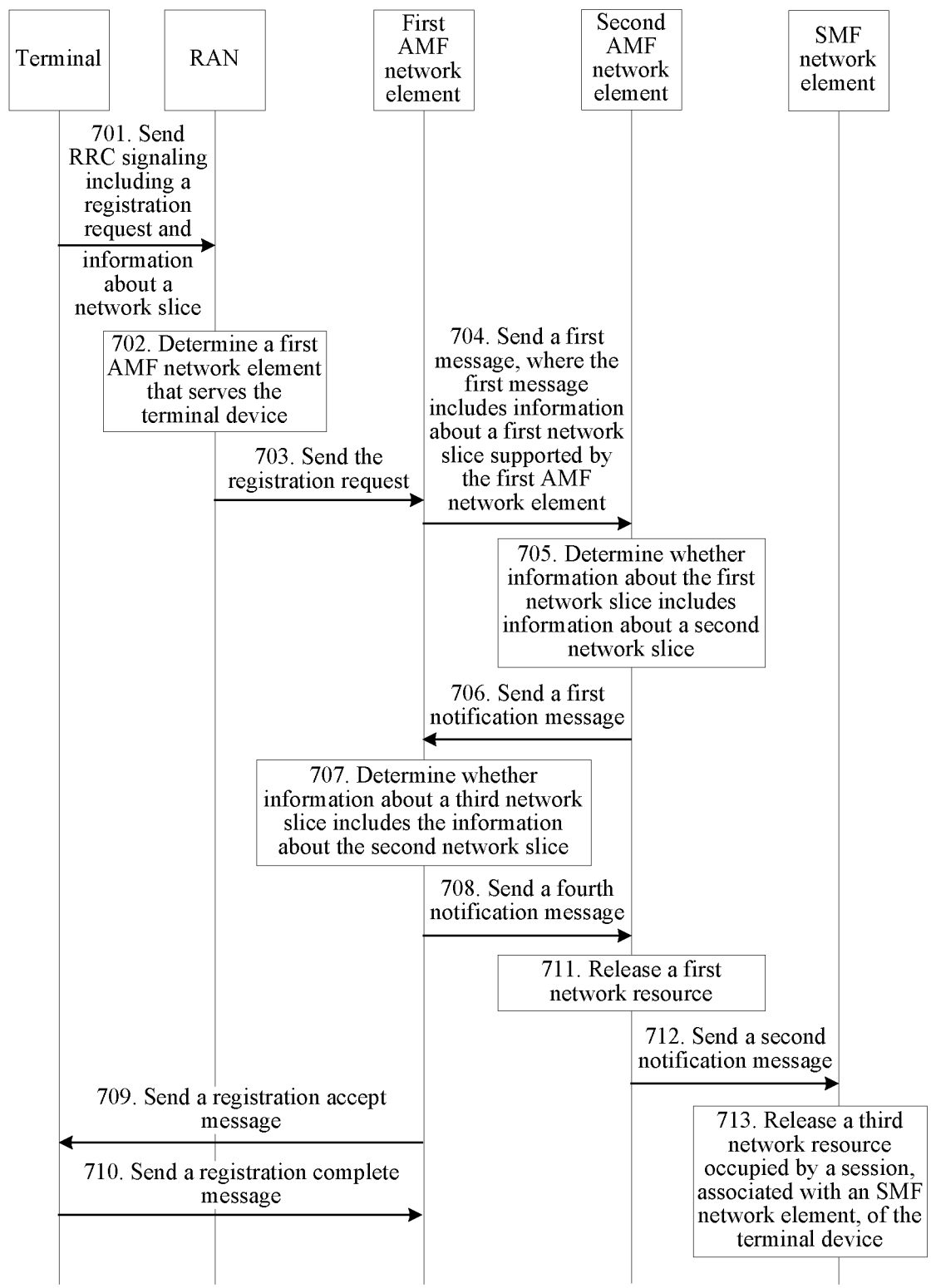
FIG. 7 is a schematic diagram of communication of still another session handling method according to an embodiment of this application.
Figure 8A:
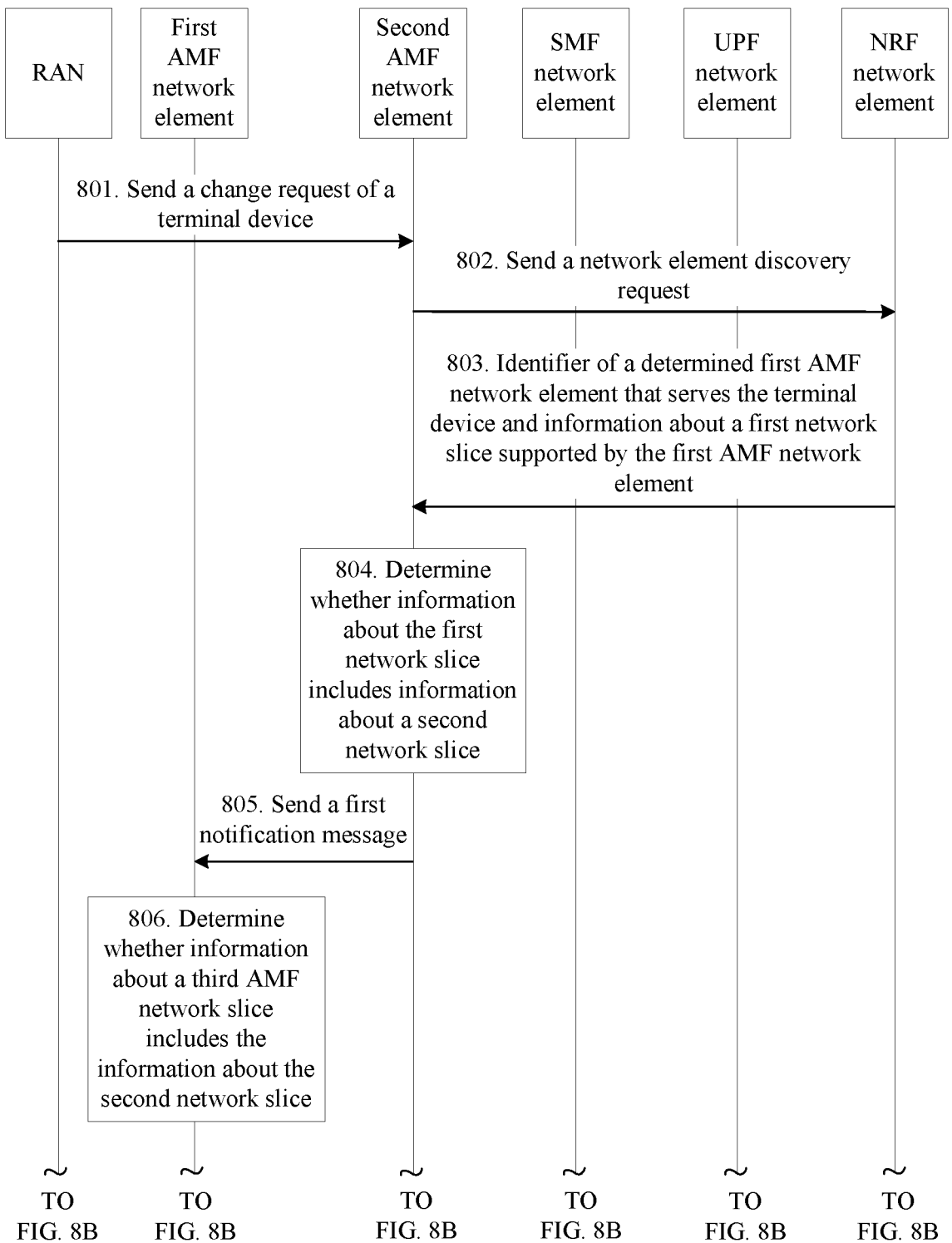
FIG. 8A and FIG. 8B are schematic diagrams of communication of still another session handling method according to an embodiment of this application.
Figure 8B:
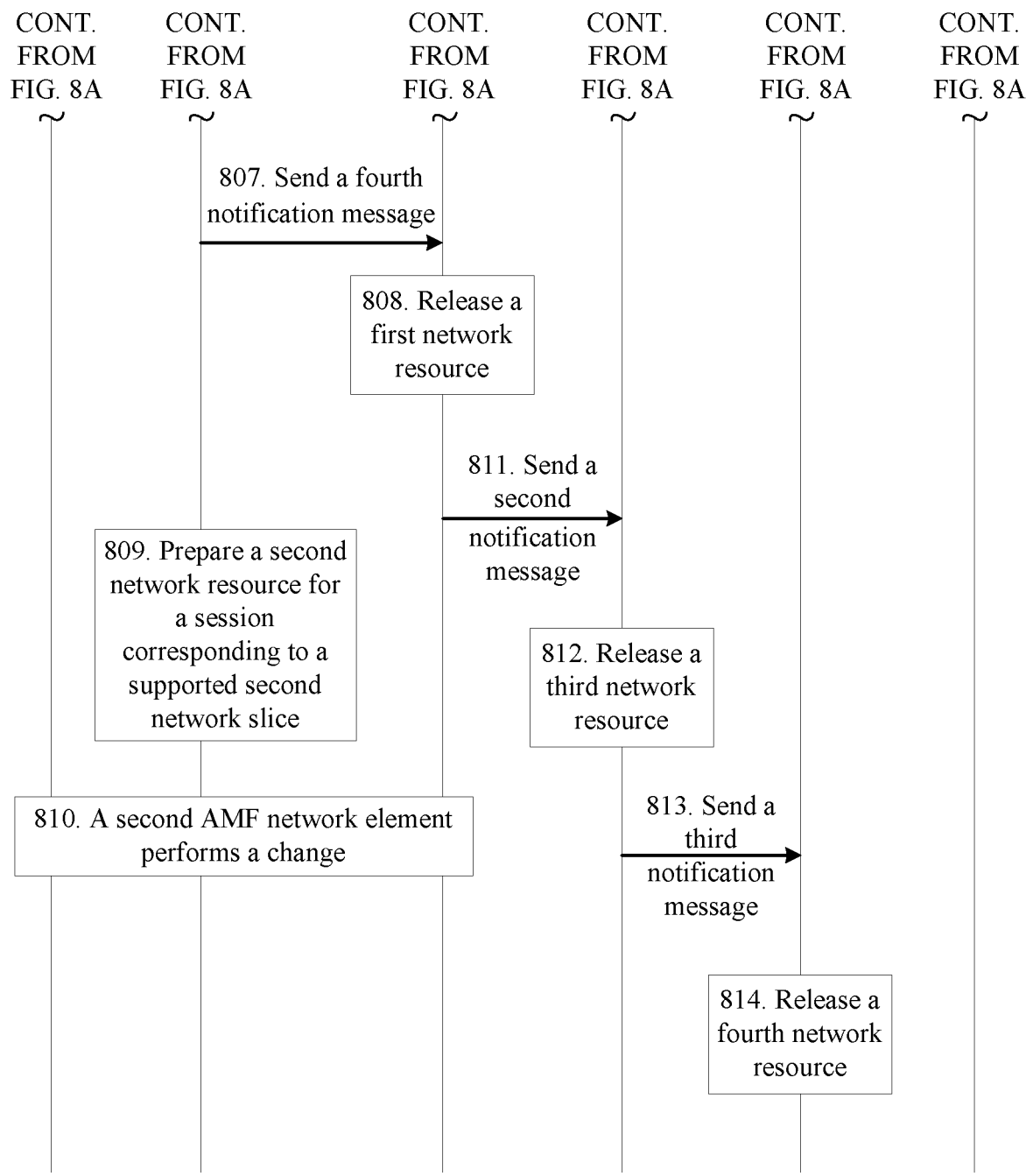

The following further describes the still another session handling method with reference to FIG. 7, FIG. 8A, and FIG. 8B.

Based on the scenario diagram in FIG. 2A, referring to FIG. 7, FIG. 7 is a schematic flowchart of a session handling method according to an embodiment of this application. As shown in FIG. 7, the method is implemented through interaction between a first AMF network element, a second AMF network element, a terminal, a RAN, and an SMF network element. The terminal is in a connected state and the second AMF network element serves the terminal. After the terminal is changed from the connected state to an idle state, in a process of terminal re-registration with a network, the RAN determines that the first AMF network element serves the terminal. The first AMF network element and the second AMF network element are different AMF network elements. For a session corresponding to a network slice unsupported by the first AMF network element, the second AMF network element and an SMF network element selected for the session by the second AMF network element still maintain a corresponding control-plane resource.

701. The terminal sends, to the RAN using radio resource control signaling, a registration request and information about a network slice corresponding to a current session of the terminal.

702. The RAN determines the first AMF network element that serves the terminal.

703. The RAN sends the registration request to the first AMF network element.

For descriptions of step 701, step 702, and step 703, refer to step 401, step 402, and step 403 in the embodiment shown in FIG. 4. Details are not described herein again.

704. The first AMF network element sends a first message to the second AMF network element. The first message includes information about a first network slice supported by the first AMF network element.

For example, after receiving the registration request sent by the RAN, the first AMF network element sends the first message to the second AMF network element. The first message includes the information about the first network slice supported by the first AMF network element. In this way, the second AMF network element determines whether the information about the first network slice includes information about a second network slice corresponding to the session of the terminal.

Optionally, the first message is a context obtaining request and is used to obtain a context of the terminal.

705. The second AMF network element determines whether the information about the first network slice includes information about a second network slice.

The current session of the terminal includes one session or at least two sessions. When the current session of the terminal includes one session, the first AMF network element determines whether the information about the first network slice includes information about a second network slice corresponding to the one session. When the current session of the terminal includes at least two sessions, the first AMF network element determines whether the information about the first network slice includes information about a second network slice corresponding to all or some of the at least two sessions.

For the case in which there is only one session, if determining that the information about the first network slice includes the information about the second network slice corresponding to the session, the second AMF network element performs step 706 of sending, by the second AMF network element, a first notification message to the first AMF network element.

For the case in which there are at least two sessions, if determining that the information about the first network slice includes the information about the second network slice corresponding to all or some of the at least two sessions, the second AMF network element performs step 706 of sending, by the second AMF network element, a first notification message to the first AMF network element.

In other words, the second AMF network element determines, based on the information about the first network slice supported by the first AMF network element, whether the information about the first network slice includes the information about the second network slice corresponding to the session, to determine whether network slice deployment of the first AMF network element causes the first AMF network element not to support the second network slice.

Optionally, when determining that the first AMF network element supports the second network slice corresponding to the one session or the second network slice corresponding to all or some of the at least two sessions, the second AMF network element performs step 706 of sending a first notification message to the first AMF network element.

706. The second AMF network element sends a first notification message to the first AMF network element.

The first notification message is used to notify the first AMF network element that the information about the first network slice includes information about a second network slice corresponding to a first session. The first session is one session of the terminal or all or some of the at least two sessions, and a second session is a session in the one session or the at least two sessions exclusive of the first session.

Optionally, the first notification message includes indication information, for example, a supported slice, and a session identifier of the first session.

Optionally, the first notification message further includes a DNN of the first session. As such, the first AMF network element selects an SMF network element based on the DNN and the information about the supported second network slice corresponding to the session.

707. The first AMF network element determines whether information about a third network slice includes the information about the second network slice.

The information about the third network slice is information about an allowed network slice allocated to the terminal, for example, an allowed NSSAI. For example, the first AMF network element obtains the information about the third network slice from a network slice selection function (NSSF) network element.

For any session of the first session included in the first notification message, information about a second network slice corresponding to the session is included in the information about the first network slice. If the information about the allowed third network slice does not include the information about the second network slice corresponding to the session, it indicates that the first AMF network element does not support the second network slice corresponding to the session. If the information about the allowed third network slice includes the information about the second network slice corresponding to the session, it indicates that the first AMF network element supports the network slice corresponding to the session.

Based on the determining result, the first AMF network element can determine a session that can be served by the first AMF network element and a session that cannot be served by the first AMF network element. In this embodiment, the first AMF network element does not support a network slice corresponding to a third session, but the first AMF network element supports a network slice corresponding to a session in the first session exclusive of the third session.

708. The first AMF network element sends a fourth notification message to the second AMF network element.

The fourth notification message is used to notify that the first AMF network element does not support a second network slice corresponding to the third session. The third session is all or some sessions of the first session. In this way, the second AMF network element determines that the first AMF network element does not support the third session, and releases a first network resource occupied by the third session.

Optionally, when a quantity of sessions included in the third session is less than that included in the first session, the first AMF network element performs step 709.

709. The first AMF network element sends a registration accept message to the terminal.

710. The terminal sends a registration complete message to the first AMF network element.

For descriptions of step 709 and step 710, refer to step 408 and step 409 in the embodiment shown in FIG. 4. Details are not described herein again.

711. The second AMF network element releases a first network resource.

After step 705, when the current session of the terminal includes one session, if the information about the first network slice does not include information about a second network slice corresponding to the session, step 706 to step 710 are skipped in this embodiment, Instead, step 711 of releasing, by the second AMF network element, a first network resource occupied by the session is performed.

It is assumed that the current session of the terminal includes at least two sessions, and the information about the first network slice includes information about the second network slice corresponding to the first session, where the first session is included in the at least two sessions. If the first session is the same as the at least two sessions, in this embodiment, step 706 is performed after step 705, and step 711 is skipped temporarily. If the first session includes less than at least two sessions, in this embodiment, step 706 is performed after step 705, and step 711 of releasing, by the second AMF network element, a first network resource occupied by a session in the at least two sessions exclusive of the first session is performed, to reduce a waste of network resources.

When receiving the fourth notification message sent by the first AMF network element, the second AMF network element performs step 711 of releasing a first network resource occupied by the third session, to reduce a waste of network resources.

For an implementation of step 711 of releasing a first network resource by the second AMF network element, refer to detailed descriptions of step 410 in the embodiment shown in FIG. 4. Details are not described herein again.

712. When releasing first network resources occupied by a second session and a third session, the second AMF network element sends a second notification message to an SMF network element associated with a session identifier of each of the second session and the third session.

Correspondingly, the SMF network element receives the second notification message from the second AMF network element.

713. The SMF network element releases a third network resource occupied by a session, associated with the SMF network element, of the terminal.

For detailed descriptions of step 712 and step 713, refer to step 411 and step 412 in the embodiment shown in FIG. 4. Details are not described herein again.

In this embodiment of this application, it is determined that the first AMF network element does not support the second network slice corresponding to all or some of the sessions of the terminal, such that the second AMF network element can release the network resource occupied by the unsupported session, thereby reducing a waste of network resources. In addition, the second AMF network element notifies the SMF network element that the terminal has moved out of the service area of the second AMF network element, such that the SMF network element is triggered in a timely manner to release the network resource occupied by the session, thereby further reducing a waste of network resources.

Based on the scenario diagram in FIG. 2B, referring to FIG. 8A and FIG. 8B, FIG. 8A and FIG. 8B are schematic flowcharts of a session handling method according to an embodiment of this application. As shown in FIG. 8A and FIG. 8B, the method is implemented through interaction between a first AMF network element, a second AMF network element, a terminal, a RAN, an NRF network element, an SMF network element, and a UPF network element. In a scenario in which the terminal needs to change an AMF network element, the second AMF network element is an AMF network element that serves the terminal before the change, and the first AMF network element is an AMF network element that is determined by the NRF network element and that the terminal is to be changed to. The first AMF network element and the second AMF network element are different AMF network elements. For a session corresponding to a network slice unsupported by the first AMF network element, the second AMF network element and an SMF network element selected for the session by the second AMF network element still maintain a corresponding control-plane resource, and a UPF network element selected for the session by the second AMF network element still maintains a corresponding user-plane resource.

801. The RAN sends a change request of the terminal to the second AMF network element.

802. The second AMF network element sends a network element discovery request to the NRF network element.

803. The NRF network element sends, to the second AMF network element, an identifier of the determined first AMF network element that serves the terminal and information about a first network slice supported by the first AMF network element.

For descriptions of step 801, step 802, and step 803, refer to step 501, step 502, and step 503 in the embodiment shown in FIG. 5A. Details are not described herein again.

804. The second AMF network element determines whether the information about the first network slice includes information about a second network slice.

805. The second AMF network element sends a first notification message to the first AMF network element.

806. The first AMF network element determines whether information about a third network slice includes the information about the second network slice.

807. The first AMF network element sends a fourth notification message to the second AMF network element.

808. The second AMF network element releases a first network resource.

For descriptions of step 804, step 805, step 806, step 807, and step 808, refer to step 705, step 706, step 707, step 708, and step 711 in the embodiment shown in FIG. 7. Details are not described herein again.

809. The first AMF network element prepares a second network resource for a session corresponding to a supported second network slice.

If it is determined in step 806 that the first AMF network element does not support a network slice corresponding to a third session, and the first AMF network element supports a network slice corresponding to a session in the first session exclusive of the third session, the session corresponding to the supported second network slice in step 809 is the session in the first session exclusive of the third session.

For an implementation of step 806 of preparing a second network resource, refer to specific descriptions of step 507 in the embodiment shown in FIG. 5B. Details are not described herein again.

810. The second AMF network element performs a change.

For descriptions of step 810, refer to step 508 in the embodiment shown in FIG. 5B. Details are not described herein again.

811. When releasing the first network resource, the second AMF network element sends a second notification message to an SMF network element associated with a session identifier of each of the second session and the third session.

Correspondingly, the SMF network element receives the second notification message from the second AMF network element.

812. The SMF network element releases a third network resource occupied by a session, associated with the SMF network element, of the terminal.

For detailed descriptions of step 811 and step 812, refer to step 411 and step 412 in the embodiment shown in FIG. 4. Details are not described herein again.

813. The SMF network element sends a third notification message to a UPF network element associated with a session identifier of the session. The third notification message is used to notify the UPF network element that the terminal has moved out of a slice service area of the second AMF network element.

Correspondingly, the UPF network element receives the third notification message from the SMF network element.

814. The UPF network element releases a fourth network resource occupied by a session, associated with the UPF network element, of the terminal.

For detailed descriptions of step 813 and step 814, refer to step 512 and step 513 in the embodiment shown in FIG. 5B. Details are not described herein again.

In this embodiment of this application, it is determined that the first AMF network element does not support the second network slice corresponding to the session of the terminal. As such, the second AMF network element can release a network resource occupied by the unsupported session, thereby reducing a waste of network resources. In addition, the second AMF network element notifies the SMF network element that the terminal has moved out of the service area of the second AMF network element. This way, the SMF network element is triggered in a timely manner to release the network resource occupied by the session, thereby further reducing a waste of network resources.

The foregoing mainly describes the solutions provided in the embodiments of this application from a perspective of interaction between different network elements. It can be understood that, to implement the foregoing functions, the first AMF network element, the second AMF network element, the SMF network element, or the UPF network element includes a hardware structure and/or software module corresponding to each function. With reference to the examples described in the embodiments disclosed in this application, units and algorithm steps can be implemented by hardware or a combination of hardware and computer software in this embodiment of this application. Whether a function is implemented by hardware or in a manner of driving hardware by a computer software depends on a particular application and a design constraint condition of the technical solution. For each particular application, a person skilled in the art may use different methods to implement the described functions, but it should not be considered that the implementation goes beyond the scope of this application.

In embodiments of this application, function module or function unit division may be performed on the first AMF network element, the second AMF network element, the SMF network element, the UPF network element, or the like based on the example of the method. For example, function modules or function units may be divided for corresponding functions, or two or more than two functions may be integrated into one processing module or processing unit. The integrated module or unit may be implemented in a form of hardware, or may be implemented in a form of a software function module. It should be noted that the module or unit division in embodiments of this application is an example, and is merely logical function division, or may be other division in actual implementation.

Figure 9:
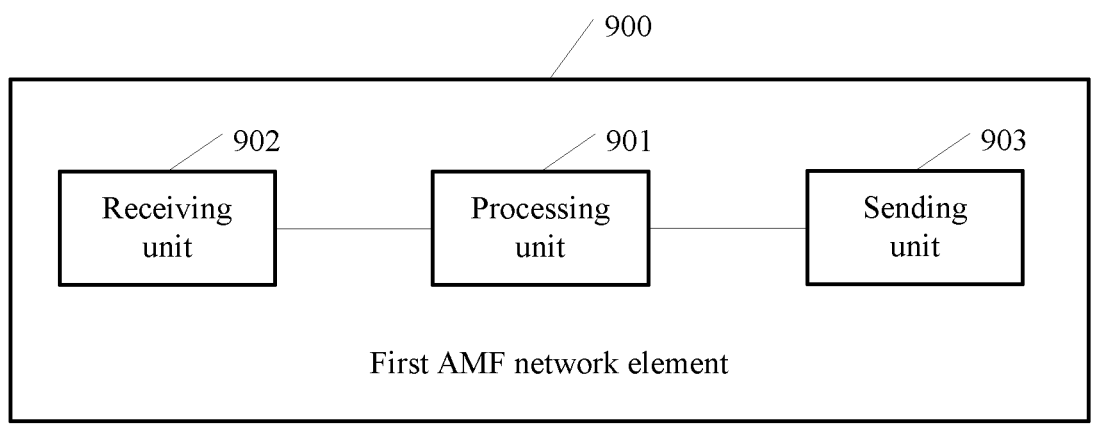
FIG. 9 is a schematic block diagram of a first access and mobility management function network element according to an embodiment of this application.

When different function modules or units are used, FIG. 9 is a possible schematic block diagram of an AMF network element 900 according to an embodiment of this application. The AMF network element 900 may be the first AMF network element 900 in the foregoing methods and can perform each step performed by the first AMF network element in the methods in FIG. 3 to FIG. 8B. For example, the first AMF network element 900 can perform procedures 301 and 302 in FIG. 3, procedures 403, 404, 405, 406, 407, and 408 in FIG. 4, procedures 504, 505, 506, 507, and 508 in FIG. 5A and FIG. 5B, procedures 605, 606, and 607 in FIG. 6A and FIG. 6B, procedures 703, 704, 706, 707, 708, 709, and 710 in FIG. 7, procedures 805, 806, 807, 809, and 810 in FIG. 8A and FIG. 8B, and/or other procedures of the technology described in this specification.

As shown in FIG. 9, the first AMF network element 900 includes a processing unit 901, a receiving unit 902, and a sending unit 903.

The processing unit 901 receives a first message from a second AMF network element using the receiving unit 902. The first message includes information about a second network slice corresponding to a current session of a terminal, and the session includes one session or at least two sessions.

When the sending unit 903 determines that the first AMF network element does not support a second network slice corresponding to the one session or a second network slice corresponding to all or some of the at least two sessions, the processing unit 901 sends a first notification message to the second AMF network element. The first notification message is used to notify the second AMF network element that the first AMF network element does not support the second network slice corresponding to the one session or the second network slice corresponding to all or some of the at least two sessions.

Figure 10:
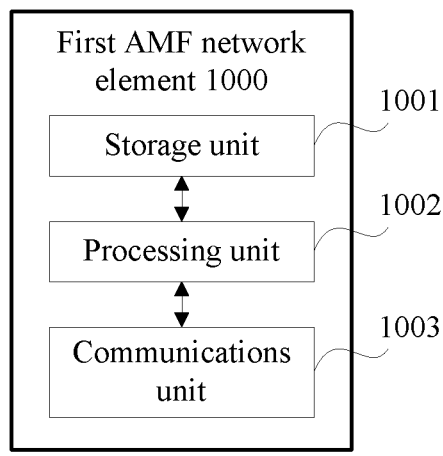
FIG. 10 is a schematic block diagram of another first access and mobility management function network element according to an embodiment of this application.

When an integrated module or unit is used, FIG. 10 is a possible schematic block diagram of a first AMF network element 1000 according to an embodiment of this application. The first AMF network element 1000 includes a processing unit 1002 and a communications unit 1003. The processing unit 1002 is configured to perform control management on an action of the first AMF network element 1000. For example, the processing unit 1002 is configured to support the first AMF network element 1000 in performing procedures 301 and 302 in FIG. 3, procedures 403, 404, 405, 406, 407, and 408 in FIG. 4, procedures 504, 505, 506, 507, and 508 in FIG. 5A and FIG. 5B, procedures 605, 606, and 607 in FIG. 6A and FIG. 6B, procedures 703, 704, 706, 707, 708, 709, and 710 in FIG. 7, procedures 805, 806, 807, 809, and 810 in FIG. 8A and FIG. 8B, and/or other procedures of the technology described in this specification. The communications unit 1003 is configured to support communication between the first AMF network element 1000 and a second AMF network element or another network element. The first AMF network element 1000 may further include a storage unit 1001 configured to store program code and data of the first AMF network element 1000.

The processing unit 1002 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1002 may implement or execute various example logical blocks, modules, and circuits described with reference to content disclosed in this application. Alternatively, the processing unit 1002 may be a combination for implementing a computing function, for example, a combination of one or more microprocessors or a combination of the DSP and a microprocessor. The communications unit 1003 may be a communications interface, a transceiver, a transceiver circuit, or the like. The communications interface is a general name. During implementation, the communications interface may include a plurality of interfaces, for example, an interface between the first AMF network element 1000 and a service management unit and/or another interface. The storage unit 1001 may be a memory.

Figure 11:
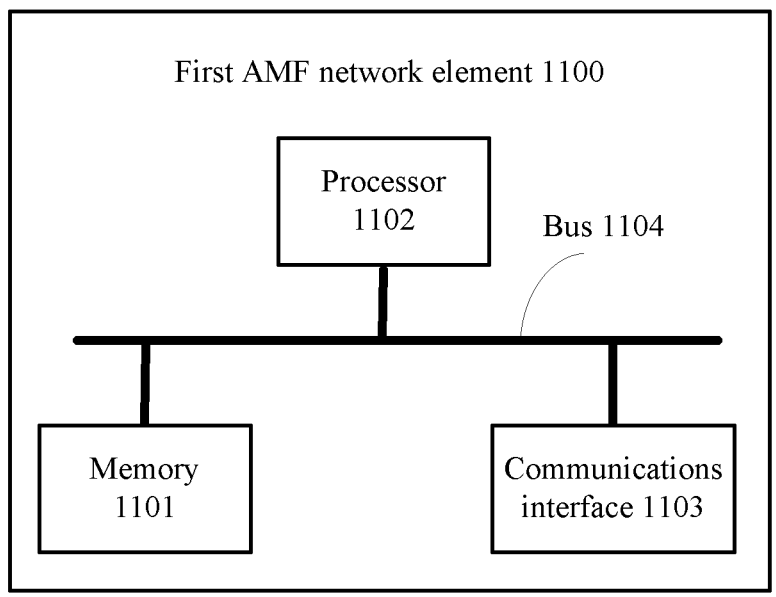
FIG. 11 is a schematic structural diagram of a first access and mobility management function network element according to an embodiment of this application.

When the processing unit 1002 is a processor, the communications unit 1003 is a communications interface, and the storage unit 1001 is a memory, a network component management unit included in this application may be a first AMF network element 1100 shown in FIG. 11.

As shown in FIG. 11, the first AMF network element 1100 includes a processor 1102, a communications interface 1103, and a memory 1101. Optionally, the first AMF network element 1100 may further include a bus 1104. The communications interface 1103, the processor 1102, and the memory 1101 may be connected to each other using the bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of representation, the bus 1104 is represented using only one bold line in FIG. 11, which, however, does not mean that there is only one bus or one type of bus.

For concepts, explanations, detailed descriptions, and other steps that are related to the technical solutions provided by the embodiments of this application and that are related to the first AMF network element 900 in FIG. 9, the first AMF network element 1000 in FIG. 10, and the first AMF network element 1100 in FIG. 11, refer to descriptions in the foregoing method or descriptions about the content in other embodiments. Details are not described herein again.

Figure 12:
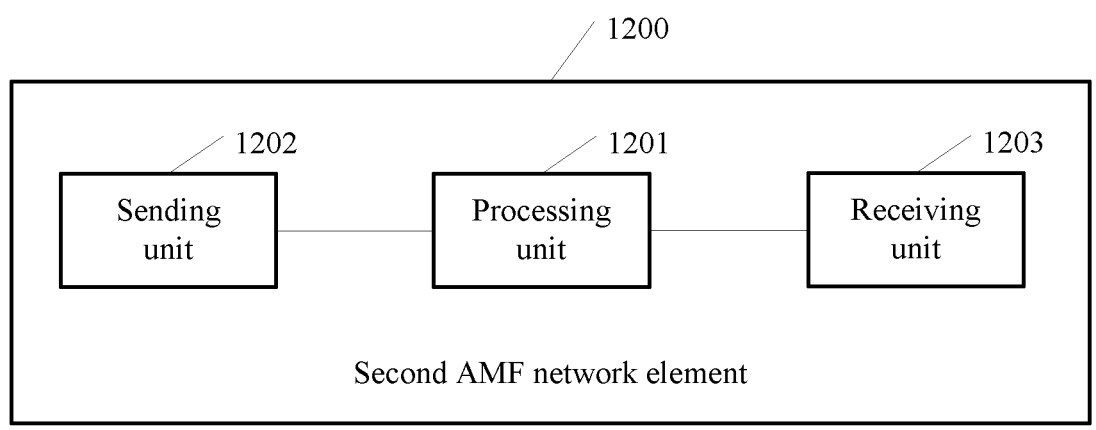
FIG. 12 is a schematic block diagram of a second access and mobility management function network element according to an embodiment of this application.

When different function modules or units are used, FIG. 12 is a possible schematic block diagram of an AMF network element 1200 according to an embodiment of this application. The AMF network element 1200 may be the second AMF network element 1200 in the foregoing methods and can perform each step performed by the second AMF network element in the methods in FIG. 3 to FIG. 8B. For example, the second AMF network element 1200 can perform procedures 301, 302, and 303 in FIG. 3, procedures 404, 405, 407, 410, and 411 in FIG. 4, procedures 501, 502, 503, 504, 506, 509, and 510 in FIG. 5A and FIG. 5B, procedures 601, 602, 603, 604, 605, 607, 608, and 609 in FIG. 6A and FIG. 6B, procedures 704, 705, 706, 708, 711, and 712 in FIG. 7, procedures 801, 802, 803, 804, 805, 807, 808, 810, and 811 in FIG. 8A and FIG. 8B, and/or other procedures of the technology described in this specification.

As shown in FIG. 12, the second AMF network element 1200 includes a processing unit 1201, a sending unit 1202, and a receiving unit 1203.

The processing unit 1201 sends a first message to a first AMF network element using the sending unit 1202. The first message includes information about a second network slice corresponding to a current session of a terminal, and the session includes one session or at least two sessions.

The processing unit 1201 receives a first notification message from the first AMF network element using the receiving unit 1203. The first notification message is used to notify the second AMF network element that the first AMF network element does not support a second network slice corresponding to the one session or a second network slice corresponding to all or some of the at least two sessions.

The processing unit 1201 is further configured to release a network resource corresponding to the one session or network resources corresponding to all or some of the at least two sessions.

Figure 13:
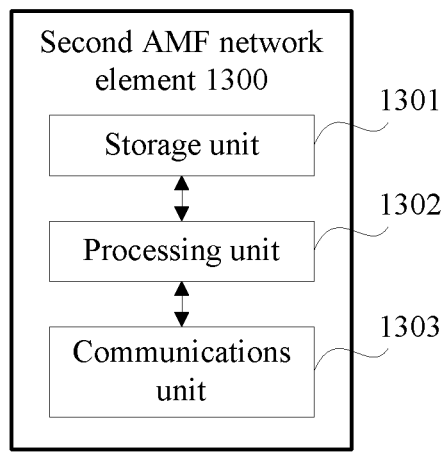
FIG. 13 is a schematic block diagram of another second access and mobility management function network element according to an embodiment of this application.

When an integrated module or unit is used, FIG. 13 is a possible schematic block diagram of a second AMF network element 1300 according to an embodiment of this application. The second AMF network element 1300 includes a processing unit 1302 and a communications unit 1303. The processing unit 1302 is configured to perform control management on an action of the second AMF network element 1300. For example, the processing unit 1302 is configured to support the second AMF network element 1300 in performing procedures 301, 302, and 303 in FIG. 3, procedures 404, 405, 407, 410, and 411 in FIG. 4, procedures 501, 502, 503, 504, 506, 509, and 510 in FIG. 5A and FIG. 5B, procedures 601, 602, 603, 604, 605, 607, 608, and 609 in FIG. 6A and FIG. 6B, procedures 704, 705, 706, 708, 711, and 712 in FIG. 7, procedures 801, 802, 803, 804, 805, 807, 808, 810, and 811 in FIG. 8A and FIG. 8B, and/or other procedures of the technology described in this specification. The communications unit 1303 is configured to support communication between the second AMF network element 1300 and the first AMF network element, an SMF network element, or another network element. The second AMF network element 1300 may further include a storage unit 1301 configured to store program code and data of the second AMF network element 1300.

The processing unit 1302 may be a processor or a controller, for example, a CPU, a general-purpose processor, a DSP, an ASIC, an FPGA or another programmable logic device, a transistor logic device, a hardware component, or any combination thereof. The processing unit 1302 may implement or execute various example logical blocks, modules, and circuits described with reference to content disclosed in this application. Alternatively, the processing unit 1302 may be a combination for implementing a computing function, for example, a combination of one or more microprocessors or a combination of the DSP and a microprocessor. The communications unit 1303 may be a communications interface, a transceiver, a transceiver circuit, or the like. The communications interface is a general name. During implementation, the communications interface may include a plurality of interfaces, for example, an interface between the second AMF network element 1300 and a service management unit and/or another interface. The storage unit 1301 may be a memory.

Figure 14:
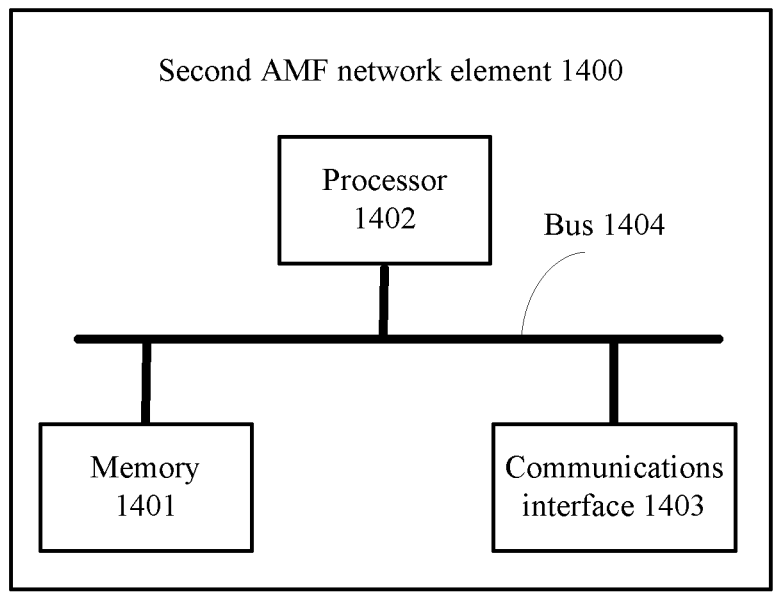
FIG. 14 is a schematic structural diagram of a second access and mobility management function network element according to an embodiment of this application.

When the processing unit 1302 is a processor, the communications unit 1303 is a communications interface, and the storage unit 1301 is a memory, a network component management unit included in this embodiment of this application may be a second AMF network element 1430 shown in FIG. 14.

As shown in FIG. 14, the second AMF network element 1430 includes a processor 1432, a communications interface 1433, and a memory 1431. Optionally, the second AMF network element 1430 may further include a bus 1434. The communications interface 1433, the processor 1432, and the memory 1431 may be connected to each other using the bus 1434. The bus 1434 may be a PCI bus, an EISA bus, or the like. The bus 1434 may be classified into an address bus, a data bus, a control bus, and the like. For ease of representation, the bus 1434 is represented using only one bold line in FIG. 14, which, however, does not mean that there is only one bus or one type of bus.

For concepts, explanations, detailed descriptions, and other steps that are related to the technical solutions provided by the embodiments of this application and that are related to the second AMF network element 1200 in FIG. 12, the second AMF network element 1300 in FIG. 13, and the second AMF network element 1430 in FIG. 14, refer to descriptions in the foregoing method or descriptions in other embodiments related to the content. Details are not described herein again.

Figure 15:
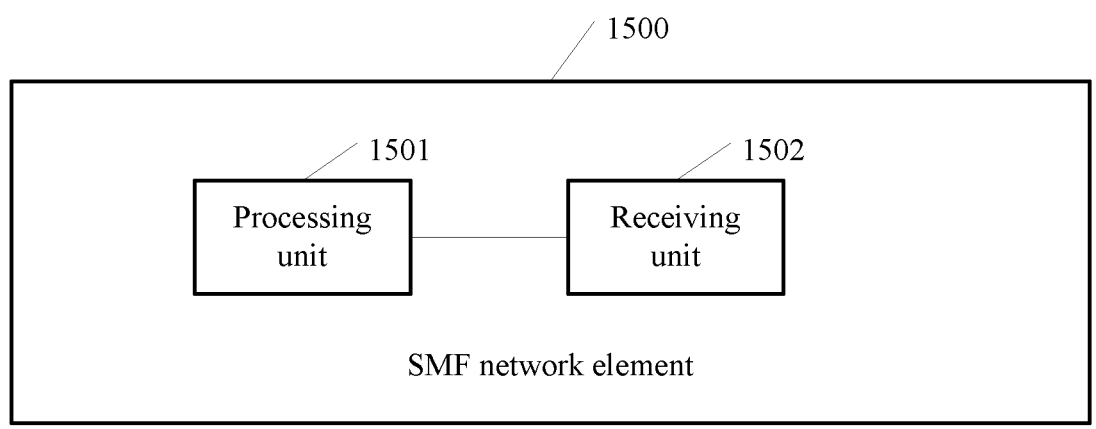
FIG. 15 is a schematic block diagram of a session management function network element according to an embodiment of this application.
Figure 16:
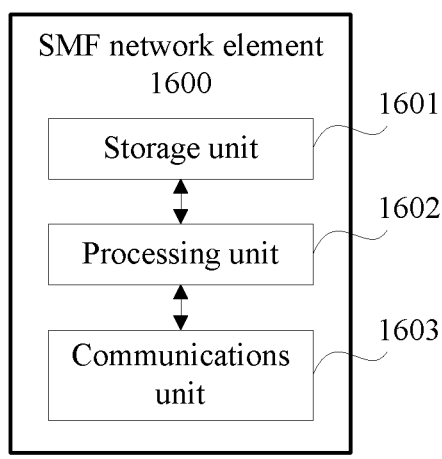
FIG. 16 is a schematic block diagram of another session management function network element according to an embodiment of this application.
Figure 17:
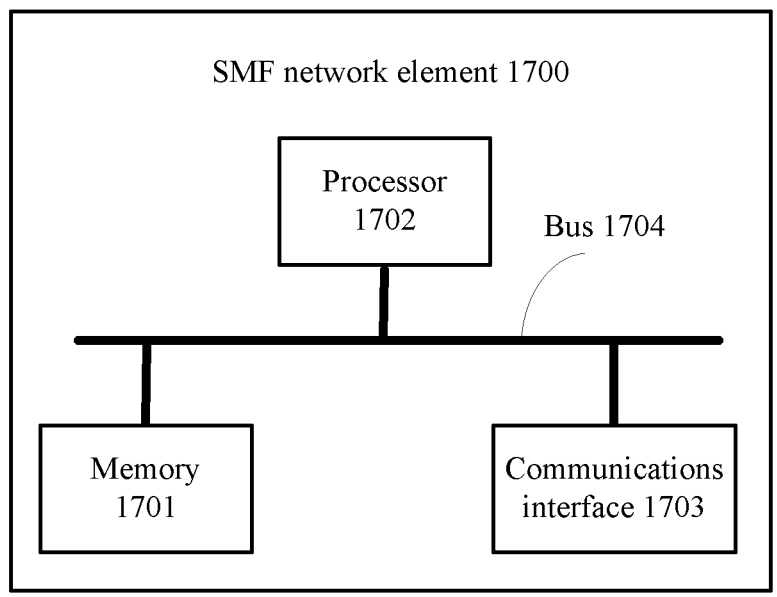
FIG. 17 is a schematic structural diagram of a session management function network element according to an embodiment of this application.

An embodiment of this application further provides an SMF network element. A schematic structural diagram of the SMF network element is similar to the schematic structural diagram of the foregoing first AMF network element or the foregoing second AMF network element, as shown in FIG. 15, FIG. 16, and FIG. 17. A module or component included in the SMF network element may correspond to an action performed by the SMF network element in the foregoing method. Details are not described herein again.

Figure 18:
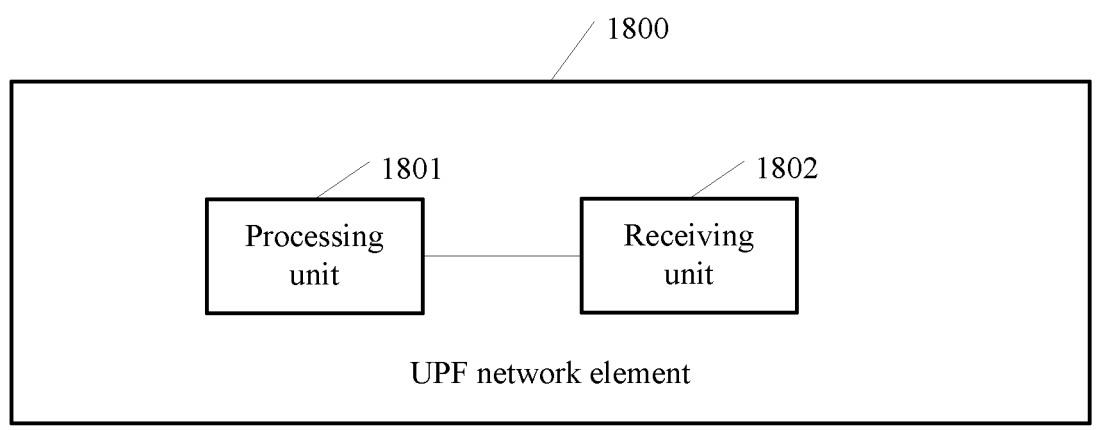
FIG. 18 is a schematic block diagram of a user-plane function network element according to an embodiment of this application.
Figure 19:
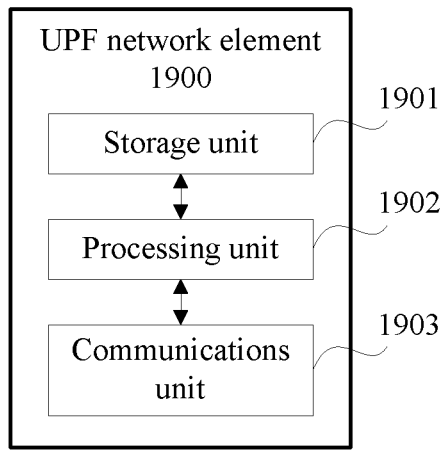
FIG. 19 is a schematic block diagram of another user-plane function network element according to an embodiment of this application.
Figure 20:
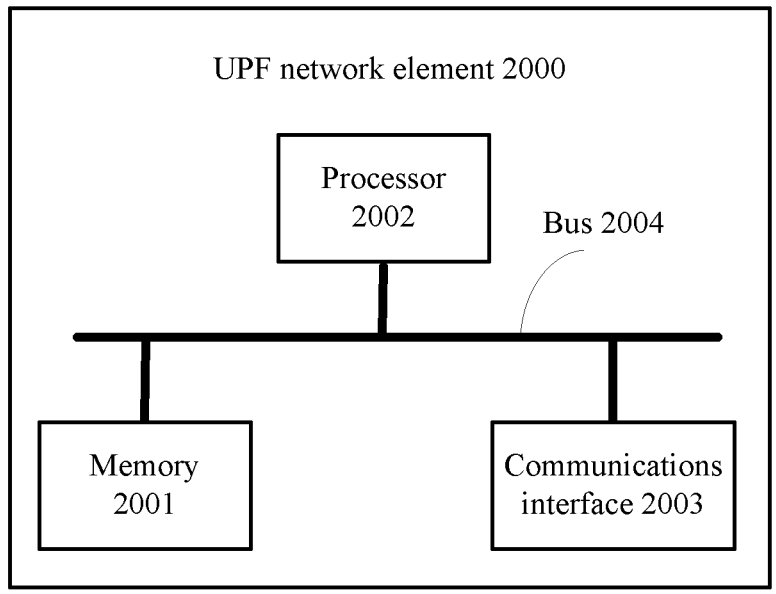
FIG. 20 is a schematic structural diagram of a user-plane function network element according to an embodiment of this application.

An embodiment of this application further provides a UPF network element. A schematic structural diagram of the UPF network element is similar to the schematic structural diagram of the foregoing first AMF network element or the foregoing second AMF network element, as shown in FIG. 18, FIG. 19, and FIG. 20. A module or component included in the UPF network element may correspond to an action performed by the UPF network element in the foregoing method. Details are not described herein again.

The methods or algorithm steps described with reference to the content disclosed in the embodiments of this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, such that the processor can read information from the storage medium, and can write information into the storage medium. Certainly, the storage medium may be a component of the processor. The processor and the storage medium may be located in an ASIC. In addition, the ASIC may be located in the first AMF network element, the second AMF network element, the SMF network element, or the UPF network element. Certainly, the processor and the storage medium, serving as discrete components, may also be located in the first AMF network element, the second AMF network element, the SMF network element, or the UPF network element.

A person skilled in the art should be aware that, in one or more of the foregoing examples, the functions described in the embodiments of this application may be partially or all implemented using hardware, software, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD), or the like.

The objectives, technical solutions, and beneficial effects of the embodiments of this application are further described in detail in the foregoing implementations. It should be understood that, the foregoing descriptions are only example implementations of the embodiments of this application, but are not intended to limit the protection scope of the embodiments of this application. Any modification, equivalent replacement, or improvement made based on the technical solutions in the embodiments of this application shall fall within the protection scope of the embodiments of this application.

The invention claimed is:

1. A session handling method comprising:
   sending, by a second access and mobility management function network element, a first message to a first access and mobility management function network element, wherein the first message comprises a session identifier of an established session of a terminal and information about a network slice corresponding to the established session;
   receiving, by the second access and mobility management function network element, a first notification message from the first access and mobility management function network element, wherein the first notification message comprises the session identifier;
   sending, by the second access and mobility management function network element in response to the first notification message, a second notification message to a session management function network element associated with the established session; and
   releasing, by the session management function network element when receiving the second notification message, a first network resource of the established session at the session management function network element.

2. The session handling method of claim 1, wherein the first message further comprises a permanent identifier of the terminal and an identifier of the session management function network element.

3. The session handling method of claim 1, wherein before sending the second notification message to the session management function network element associated with the established session, the session handling method further comprises determining, by the second access and mobility management function network element, the session management function network element based on a correspondence between session identifiers and session management function network element identifiers.

4. The session handling method of claim 1, further comprising:
   receiving, by the first access and mobility management function network element, a registration request of the terminal from a radio access network device, wherein the registration request comprises a second identifier of the second access and mobility management function network element;
   sending, by the first access and mobility management function network element based on the second identifier, an information obtaining request to the second access and mobility management function network element, wherein the information obtaining request comprises a first identifier of the terminal; and
   receiving, by the second access and mobility management function network element, the information obtaining request.

5. The session handling method of claim 1, further comprising:
   determining, by the first access and mobility management function network element, whether the network slice is supported; and
   sending, by the first access and mobility management function network element when determining that the network slice is not supported, the first notification message to the second access and mobility management function network element.

6. The session handling method of claim 5, wherein determining whether the network slice is supported comprises determining, by the first access and mobility management function network element, whether network slices supported by the first access and mobility management function network element include the network slice corresponding to the established session.

7. The session handling method of claim 5, wherein determining whether the network slice is supported comprises determining, by the first access and mobility management function network element, whether allowed network slices allocated to the terminal comprise the network slice corresponding to the established session.

8. The session handling method of claim 1, wherein the first notification message comprises a cause value, and wherein the cause value indicates that the network slice is not supported.

9. The session handling method of claim 1, wherein the first network resource comprises a session context of the established session at the session management function network element.

10. The session handling method of claim 9, wherein the session context comprises at least one of a data network name (DNN), a quality of service (QOS) flow, or a transmission resource, and wherein the transmission resource comprises a transport layer address or a tunnel address.

11. The session handling method of claim 1, further comprising releasing, by the second access and mobility management function network element in response to the first notification message, a second network resource corresponding to the established session.

12. The session handling method of claim 11, wherein the second network resource comprises the session identifier and an identifier of the session management function network element.

13. A session management system comprising:
a second access and mobility management function network element configured to:
send a first message to a first access and mobility management function network element, wherein the first message comprises a session identifier of an established session of a terminal and information about a network slice corresponding to the established session;
receive a first notification message from the first access and mobility management function network element, wherein the first notification message comprises the session identifier; and
send a second notification message in response to the first notification message; and
a session management function network element associated with the established session and configured to:
receive the second notification message from the second access and mobility management function network element; and
release, when receiving the second notification message, a first network resource of the established session at the session management function network element.

14. The session management system of claim 13, wherein the first message further comprises a permanent identifier of the terminal and an identifier of the session management function network element.

15. The session management system of claim 13, wherein the second access and mobility management function network element is further configured to determine, before sending the second notification message, the session management function network element based on a correspondence between session identifiers and session management function network element identifiers.

16. The session management system of claim 13, further comprising the first access and mobility management function network element, wherein the first access and mobility management function network element is configured to:
receive a registration request of the terminal from a radio access network device, wherein the registration request comprises a second identifier of the second access and mobility management function network element; and
send, based on the second identifier, an information obtaining request to the second access and mobility management function network element,
wherein the information obtaining request comprises a first identifier of the terminal, and wherein the second access and mobility management function network element is further configured to receive the information obtaining request from the first access and mobility management function network element.

17. The session management system of claim 13, further comprising the first access and mobility management function network element, wherein the first access and mobility management function network element is configured to:
determine whether the network slice is supported; and
send the first notification message to the second access and mobility management function network element when determining that the network slice is not supported.

18. The session management system of claim 17, wherein the first access and mobility management function network element is further configured to determine whether the network slice is supported by determining whether network slices supported by the first access and mobility management network element include the network slice corresponding to the established session.

19. The session management system of claim 17, wherein the first access and mobility management function network element is further configured to determine whether the network slice is supported by determining whether allowed network slices allocated to the terminal comprise the network slice corresponding to the established session.

20. The session management system of claim 13, wherein the first notification message comprises a cause value, and wherein the cause value indicates that the network slice is not supported.

21. The session management system of claim 13, wherein the first network resource comprises a session context of the established session at the session management function network element.

22. The session management system of claim 21, wherein the session context comprises at least one a data network name (DNN), a quality of service (QOS) flow, or a transmission resource, and wherein the transmission resource comprises a transport layer address or a tunnel address.

23. The session management system of claim 13, further comprising releasing, by the second access and mobility management function network element in response to the first notification message, a second network resource corresponding to the established session.

24. The session management system of claim 23, wherein the second network resource comprises the session identifier and an identifier of the session management function network element.

25. A computer program product comprising instructions that are stored on a non-transitory computer-readable medium and that, when executed by one or more processors, cause a first access and mobility management function network element to:
receive a first message from a second access and mobility management function network element, wherein the first message comprises a session identifier of an established session of a terminal and comprises information about a network slice corresponding to the established session; and
send, when determining that the first access and mobility management function network element does not support the network slice corresponding to the established session, a first notification message to the second access and mobility management function network element, wherein the first notification message triggers a release of a network resource of the established session at a session management function network element associated with the established session.

26. The computer program product of claim 25, wherein the first message further comprises a permanent identifier of the terminal and an identifier of the session management function network element.

27. The computer program product of claim 25, wherein the instructions, when executed by the one or more processors, further cause the first access and mobility management function network element to determine that the first access and mobility management function network element does not support the network slice corresponding to the established session by determining that information about network slices supported by the first access and mobility management function network element does not comprise the information about the network slice corresponding to the established session.

28. The computer program product of claim 25, wherein the instructions, when executed by the one or more processors, further cause the first access and mobility management function network element to determine that the first access and mobility management function network element does not support the network slice corresponding to the established session by determining that allowed network slices allocated to the terminal comprise the network slice corresponding to the established session.

29. The computer program product of claim 25, wherein the first notification message comprises a cause value, and wherein the cause value indicates that the network slice is not supported.

* * * * *